US006964367B2

(12) United States Patent
O'Callaghan et al.

(10) Patent No.: US 6,964,367 B2
(45) Date of Patent: *Nov. 15, 2005

(54) AUTOMATIC SYSTEM FOR VERIFYING ARTICLES CONTAINING INDICIA THEREON

(75) Inventors: John S. O'Callaghan, Skokie, IL (US); Daniel Gibbons, Arlington Heights, IL (US); Tony S. Chan, Northbrook, IL (US); Ann Dawkins, Bartlett, IL (US); Niren Shah, Palatine, IL (US); Jack Bonn, Barrington, IL (US)

(73) Assignee: Bowe Bell + Howell Company, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/949,201

(22) Filed: Sep. 7, 2001

(65) Prior Publication Data

US 2004/0211838 A1 Oct. 28, 2004

(Under 37 CFR 1.47)

Related U.S. Application Data

(63) Continuation-in-part of application No. 08/909,640, filed on Aug. 12, 1997, now Pat. No. 6,311,892.

(51) Int. Cl.$^7$ .............................................. G06F 17/00
(52) U.S. Cl. ..................... 235/375; 235/385; 235/470
(58) Field of Search ................................. 235/375, 376, 235/381, 385, 435, 470; 209/584, 900

(56) References Cited

U.S. PATENT DOCUMENTS

| | | | | | |
|---|---|---|---|---|---|
| 4,778,062 | A | * | 10/1988 | Pavie et al. | 209/546 |
| 4,800,505 | A | * | 1/1989 | Axelrod et al. | 209/584 |
| 4,868,757 | A | * | 9/1989 | Gil | 364/464 |
| 5,009,321 | A | * | 4/1991 | Keough | 209/584 |
| 5,087,125 | A | * | 2/1992 | Narutaki | 356/375 |
| 5,329,102 | A | * | 7/1994 | Sansone | 235/375 |
| 5,444,779 | A | * | 8/1995 | Daniele | 380/3 |
| 5,508,818 | A | * | 4/1996 | Hamma | 358/403 |
| 5,862,243 | A | * | 1/1999 | Baker et al. | 235/462.01 |
| 5,890,818 | A | * | 4/1999 | Sansone | 400/103 |
| 6,311,892 | B1 | * | 11/2001 | O'callaghan et al. | 235/375 |
| 6,575,358 | B2 | * | 6/2003 | O'Callaghan et al. | 235/375 |

* cited by examiner

Primary Examiner—Daniel St. Cyr
(74) Attorney, Agent, or Firm—McDermott Will & Emery LLP

(57) ABSTRACT

A method and apparatus for automatically acquiring and verifying, relative to pre-established rules, information affixed to relatively flat articles transported along a transport path comprises a weighing device for measuring weight of articles being processed, an image acquisition device for acquiring a representation of indicia appearing on an article, a thickness detecting device for measuring the thickness of articles being processed, a processing device for recognition of the indicia appearing on an article, and a processing device for verifying acquired data against the pre-established rules. A number of reports are generated after processing to provide the results of the processing.

20 Claims, 59 Drawing Sheets

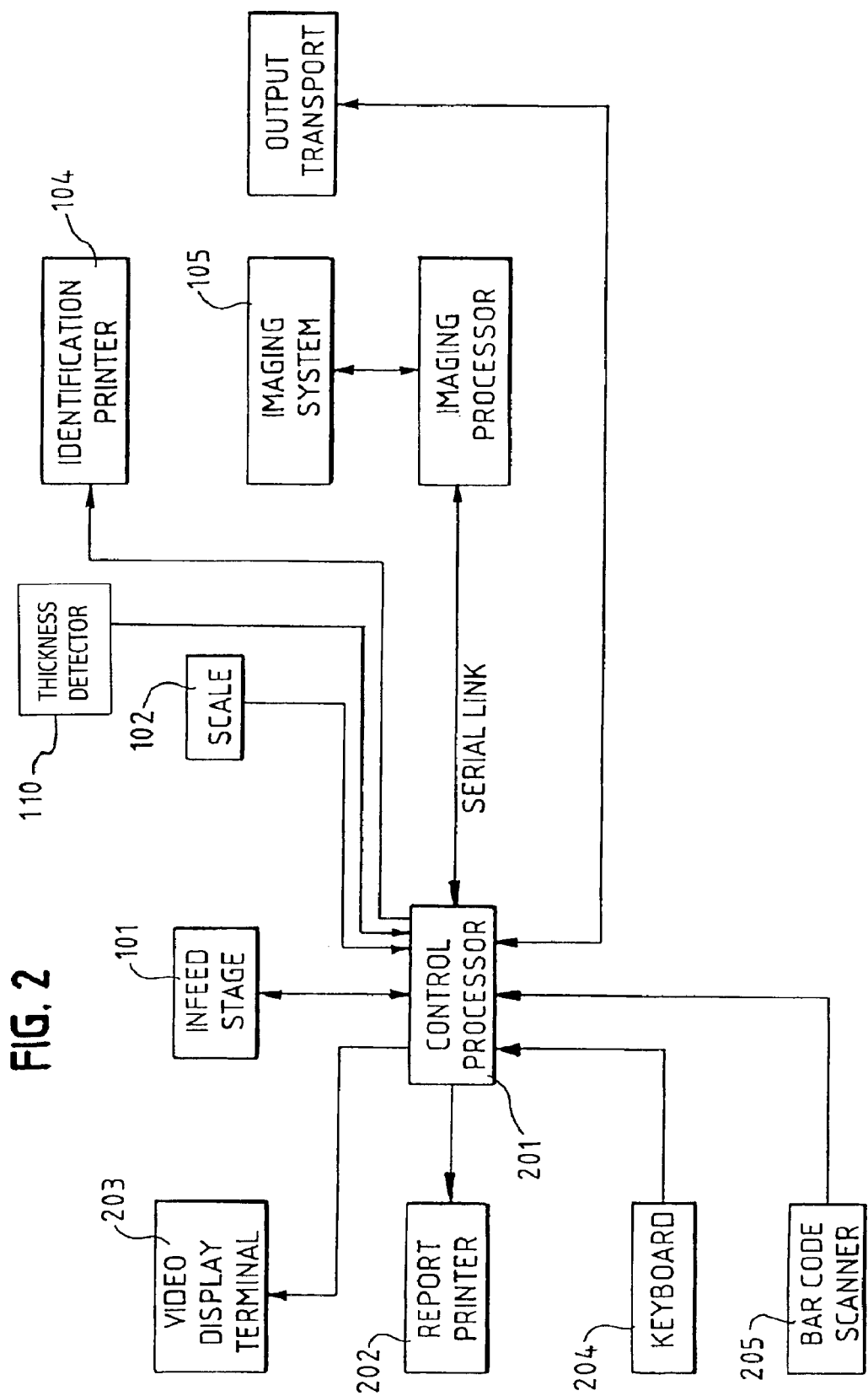

FIG. 3

| OFFSET | MESSAGE | NUMBER OF BYTES | CHARACTER FORMAT | RESULT |
|---|---|---|---|---|
| 0 | <START_CHAR> | 1 BYTE | ASCII | '#' |
| 1 | <SEQUENCE_NO> | 2 BYTES | HEX/ASCII | '00'→'FF' |
| 3 | <TYPE> | 1 BYTE | ASCII | SEE TABLE 33-22. |
| 4 | <DATA> | N BYTES | (SEE INDIVIDUAL MESSAGES) | (SEE INDIVIDUAL MESSAGES) |
| 4 + N | <CRC> | 4 BYTES | HEX/ASCII | '0000'→'FFFF' |
| 8 + N | <STOP_CHAR> | 1 BYTE | ASCII | 'v' |

FIG. 4

| TYPE FIELD | MESSAGE NAME | COMMENTS |
|---|---|---|
| 'A' | ACK | ACKNOWLEDGEMENT |
| 'B' | CPC_IPC_BEGINRUN | GET READY TO BEGIN AN INSPECTION RUN. |
| '@' | CPC_IPC_DIAGNOSE | REQUEST DIAGNOSTIC TO BE RUN ON IPC. |
| '%' | IPC_CPC_DIAGNOSTICRESPONSE | SENDS RESULT FROM A DIAGNOSTIC REQUEST |
| 'Y' | IPC_CPC_FAULT | ASYNCHRONOUS FAULT DETECTED. |
| 'N' | NACK | NEGATIVE ACKNOWLEDGEMENT |
| 'O' | IPC_CPC_POSTAGESCANRESULT | INFORMATION GLEANED FROM THE MAIL PIECE BY THE EXEGETICS IMAGING SOFTWARE. |
| 'P' | CPC_IPC_POSTAGE | EXPECTED POSTAGE SENT TO IMAGING PC. |
| 'Q' | IPC_CPC_BARCODE SCANRESULT | INFORMATION GLEANED FROM THE MAIL PIECE BARCODE OCR SCAN. |
| 'R' | IPC_CPC_ADDRESS SCANRESULT | INFORMATION GLEANED FROM THE MAIL PIECE BY THE DALLAS IMAGING SOFTWARE. |
| 'S' | CPC_IPC_SYNCHRONIZE | SYNCHRONIZE IPC WITH TIME STAMP. |
| 'T' | CPC_IPC_TRAYDATA | TRAY TAG DATA |
| 'V' | CPC_IPC_WEDGEDATA | SAMPLE WEDGE DATA |

Reports Screen

Reports Screen with Error Symbols

Presort Reports Tab

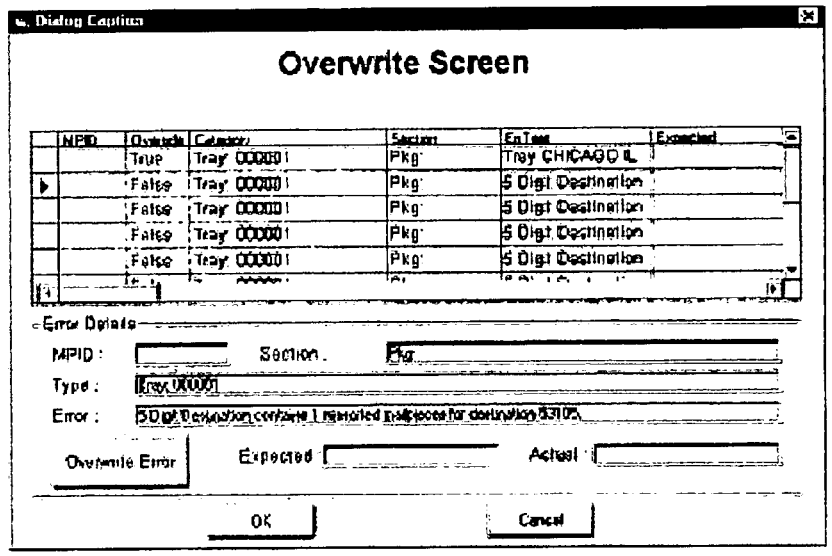

Figure 5-4
Overwrite Screen

Table 5-1
Overwrite Screen

| Field | Function |
|---|---|
| Error Display | This area lists the errors found in the report and allows the user to select and overwrite any error found in the report. |
| MPID | Displays the mailpiece identification number of the item selected for the overwrite option. |
| Section | Displays the package number (if applicable) in which the selected mailpiece can be found. |
| Type | Displays the tray number in which the selected mailpiece may be found. |
| Error | Displays the description of the error found on the mailpiece, as described in this report. |
| Expected | This field will only contain information concerning short paid analysis. It displays the amount of postage that was expected for the mailpiece. |
| Actual | This field will only contain information concerning short paid analysis. It displays the actual postage that appears on the mailpiece. |
| Overwrite Error button | Selecting this button causes the selected error to be overwritten. |
| OK button | Selecting this button causes the overwrite screen to close and the Reports screen is available. |
| Cancel button | Selecting this button causes the selected information to clear and the overwrite screen to close. |

| Site Name: Bell&Howell P&DC | Mailing ID: 3092274 | Serial No: MER00-0001 | Ver: 00B65B |

U. S. POSTAL SERVICE
PRESORT VERIFICATION RECORD
PS 2866X

| Permit No.: | MT129 | Name of Mailing Agent: | None |
| Name of Permit Holder: | B&H Presort | Mailing Date: | Tuesday, February 20, 2001 |

MAIL PRESENTED:

Class (Check One):
- ☑ First-Class
- ☐ Periodicals
- ☐ Standard-A

Type (Check One):
- ☑ Letter
- ☐ Flat

1. SACK, TRAY or PALLET LABELS

Label Error Calculated at .05 (same as dividing by 20) to compute weights for Column B.

| Sack/Tray/Pallet # | Show label as it is filled out for each sample. | If label is incorrect show how the label should be prepared for each sample. | Total Weight in Pounds | B. Weight of Errors in Pounds |
|---|---|---|---|---|
| 1 | CUDAHY WI 53110 FCM LTRS 5D BC | | 2.772 | 0.000 |
| 2 | KENOSHA WI 53140 FCM LTRS 5D BC | | 2.795 | 0.000 |
| 3 | MILWAUKEE WI 531 FCM LTRS 3D BC | | 2.785 | 0.000 |

2. PACKAGE SORTATION ERRORS

B. Weight of Errors in Pounds

3. SACK, TRAY OR PALLET SORTATION ERRORS

B. Weight of Errors in Pounds

| | |
|---|---|
| T:1  5 Digit Destination contains 1 missorted mailpiece | 0.144 |
| T:1  5 Digit Destination contains 1 missorted mailpiece | 0.138 |
| T:1  5 Digit Destination contains 2 missorted mailpiece | 0.067 |
| T:1  5 Digit Destination contains 25 missorted mailpiec | 0.890 |
| T:1  5 Digit Destination contains 17 missorted mailpiec | 0.395 |
| T:3  Contains 3 pcs for Tray 53110-5. | 0.071 |
| T:2  5 Digit Destination contains 10 missorted mailpiec | 0.243 |
| T:2  5 Digit Destination contains 21 missorted mailpiec | 0.499 |
| T:2  5 Digit Destination contains 3 missorted mailpiece | 0.072 |
| T:2  5 Digit Destination contains 4 missorted mailpiece | 0.094 |
| T:2  5 Digit Destination contains 3 missorted mailpiece | 0.072 |
| T:2  5 Digit Destination contains 1 missorted mailpiece | 0.168 |
| T:2  5 Digit Destination contains 1 missorted mailpiece | 0.256 |
| T:2  5 Digit Destination contains 1 missorted mailpiece | 0.024 |
| T:2  5 Digit Destination contains 13 missorted mailpiec | 0.517 |

Page 1 of 2

*Figure 5-5*
*USPS Presort Verification Record (Page 1)*

| Site Name: Bell&Howell P&DC | Mailing ID: 3092274 | Serial No: MER00-0001 | Ver: 00B65B |

T:3 Contains 19 pcs for Tray 53140-5.     0.967

4. TOTAL error weight for presort verification in pounds.    [ 4.598 ]

5. A. Error factor: Line 4 divided by Weight of Samples :    [ 4.598 ] / [ 8.352 ] = [ 0.551 ]   (5A)

B. Error factor. If error factor is greater than 1, 1 is entered:    [ 0.551 ]   (5B)

C. Percent of error is determined by multiplying 5B by 100:    [ 0.551 ] x [ 100 ] = [ 55.06% ]   (5C)

If line 5C is less than 5% go to line 11D. If line 5C is 5% or greater, go to line 6 AND NOTIFY SUPERVISOR IMMEDIATELY.

6. TOTAL number of pieces in the mailing :    [ 10000 ]   PIECES
7. Line 5B times line 6:    [ 0.551 ] x [ 10000 ] = [ 5506.394 ]   MAILING PIECES ERROR FACTOR
8. Line 7 times applicable single piece rate :    [ 5505.394 ] x [ 0.340 ] = [ 1871.834 ]   APPLICABLE SINGLE PIECE POSTAGE
9. Mailing pieces error factor (line 7) multiplied by average per piece rate:    [ 5505.394 ] x [ 0.00000 ] = [ 0.000 ]   ORIGINAL PRESORTED POSTAGE PAID 10. DIFFERENCES line 9 from line 8 to obtain additional revenue due (cost avoidance) :    [ $1,871.83 ]   ADDITIONAL POSTAGE DUE
See Sortation Exception Report for Additional Details.

11. DISPOSITION :
Mailer reworked mailing and corrected errors at acceptance unit - mail accepted    A ☐
Mail returned for reworking    B ☐
Additional postage collected - mail accepted    C ☐
Mail accepted - no additional postage collected    D ☐

12. Comments

13. Signature of Employee completing this form    14. Remarks

Page 2 of 2

*Figure 5-6*
*USPS Presort Verification Record (Page 2)*

Table 5-2
USPS Presort Verification Record

| Field | Description |
| --- | --- |
| Permit, Meter, or USPS Publication No. | Identification number |
| Name of Permit Holder | Name of business mailer |
| Name of Mailing Presenter | Name of person delivering mail |
| Mailing Date | Date the mail was accepted at the BMEU/DMU |
| Class | Identification of mail as First-Class, Standard, or Periodicals |
| Type | Identification of mail as Letters or Flats |
| Sack, Tray, or Pallet Labels | Sack, tray, or label information that was entered into MERLIN by the operator, including:<br>• Sack, tray, or pallet number<br>• Label as filled out<br>• Incorrect label information<br>• Actual total weight of tray |
| Package Sortation Errors | Specific details of each package sortation error if packages were included or required during the run. These errors are detailed in the Sortation Exceptions Report. |
| Sack, Tray, or Pallet Sortation Errors | Specific details of each sack, tray, or pallet sortation error. These errors are also detailed in the Sortation Exceptions Report. |
| Errors not included in Total Error Rate | Errors which have not been included in the calculated error rate |
| Total Error Weight | Total weight of all errors from presort verification |
| Error Factor Calculation | Error Factor = Error weight as a percentage of actual weight |
| Postage Error Factor Calculation | Postage Error Factor = Total number of pieces * Error Factor * Single piece rate |
| Bulk Rate on Mailing Pieces Error Factor Calculation | Bulk Rate on Mailing Pieces Error Factor = Total number of pieces * Error Factor * Average Per Piece Rate |
| Additional Postage Due | Additional Postage Due = Postage Error Factor - Bulk Rate on Mailing Pieces Error Factor |
| Disposition | Disposition of additional postage due:<br>• Mailer reworked mailing and corrected errors at acceptance unit, OR<br>• Mail returned for reworking, OR<br>• Additional postage collected, OR<br>• Mail accepted – no additional postage collected |

| Site Name: Bell&Howell P&DC | | Mailing ID: 8883030 | Serial No: MER00-0001 | Ver: 00B65B |
|---|---|---|---|---|

Sortation Exception Report

| Tray Number: | 3 | CUDAHY WI 53110 |
| | | RCM LTR 5D PC |

| MPID | Package ID | Weight(lbs) | Error Text |
|---|---|---|---|
| | | 0.487 | 5 Digit Destination contains 20 missorted mailpieces for destination 53104. |
| | | 0.538 | 5 Digit Destination contains 22 missorted mailpieces for destination 53105. |
| | | 0.144 | 5 Digit Destination contains 5 missorted mailpieces for destination 53115. |
| | | 0.144 | 5 Digit Destination contains 6 missorted mailpieces for destination 53122. |
| | | 1.505 | Tray CUDAHY WI   53110 only has 58 pcs, 150 minimum. |
| 4 | 0 | 0.024 | Incorrect Piece Sortation. Piece ZIPCode = 53115. |
| 5 | 0 | 0.024 | Incorrect Piece Sortation. Piece ZIPCode = 53115. |
| 6 | 0 | 0.024 | Incorrect Piece Sortation. Piece ZIPCode = 53115. |
| 7 | 0 | 0.024 | Incorrect Piece Sortation. Piece ZIPCode = 53115. |
| 8 | 0 | 0.024 | Incorrect Piece Sortation. Piece ZIPCode = 53122. |
| 9 | 0 | 0.024 | Incorrect Piece Sortation. Piece ZIPCode = 53122. |
| 10 | 1 | 0.025 | Incorrect Piece Sortation. Piece ZIPCode = 53122. |
| 11 | 1 | 0.025 | Incorrect Piece Sortation. Piece ZIPCode = 53104. |
| 12 | 1 | 0.025 | Incorrect Piece Sortation. Piece ZIPCode = 53104. |
| 13 | 1 | 0.026 | Incorrect Piece Sortation. Piece ZIPCode = 53104. |
| 14 | 1 | 0.025 | Incorrect Piece Sortation. Piece ZIPCode = 53104. |

Tuesday, February 20, 2001

Figure 5-7
Sortation Exception Report

Table 5-3
Sortation Exception Report (Summary section)

| Field | Description |
|---|---|
| Tray Number | The tray number to which the report applies |
| Tray Tag Information | Tray tag information |

Table 5-4
Sortation Exception Report (Individual error section)

| Field | Description |
|---|---|
| MPID | Mailpiece ID number assigned by MERLIN. This field is blank if the error is a problem with the overall run. |
| Package ID | Package ID assigned by MERLIN |
| Weight | Weight of individual mailpiece or weight of the tray/sack if the error is a problem with the overall run |
| Error Text | A description of the problem. For example:<br>• Tray/Sack contains X missorted pieces<br>• Tray only has XXX pcs, 150 minimum<br>• Incorrect Piece Sortation. Piece ZIP Code = 53203 |

| Site Name: Bell&Howell P&DC | Mailing ID: 7959080 | Serial No: MER-00-0000 | Ver: 001AC6 |
|---|---|---|---|

ECR Sequence Exception Report

| Tray Number: | 000001 | STERLING IL | 61081 |
| | | STD LTRS FCRWSH | |

Pieces Fed: 319
Pieces Checked: 313  % Good: 99

| MPID | Package ID | Weight (lbs) | Error Text |
|---|---|---|---|
| | 000000 | 0.057 | Pkg for C015 contains 2 out of sequence pcs. |
| 000214 | 000000 | 0.459 | Out of Sequence. |
| 000278 | 000000 | 0.460 | Out of Sequence. |

Wednesday, February 21, 2001

*Figure 5-8*
*ECR Exceptions Report*

Table 5-5
ECR Exceptions Report

| Field | Description |
|---|---|
| Tray Number | The number of the tray that the report covers, as determined by the sequence that the tray information was entered into MERLIN. (Tray content and destination information is displayed on the right.) |
| Pieces Fed | The number of mailpieces that were run through MERLIN. |
| Pieces Checked | The number of mailpieces run that were analyzed by MERLIN for ECR sequence. |
| Percent Good | The percentage of mailpieces checked that were in compliance with ECR sequence pre-sort requirements. |
| MPID | The mailpiece ID number of the mailpiece that has an exception. |
| Package ID | The package number, (if packages were included or required) of the mailpiece with the exception. |
| Weight | The weight in pounds of the mailpiece with the exception. |
| Error Text | Displays an explanation of the error found. |

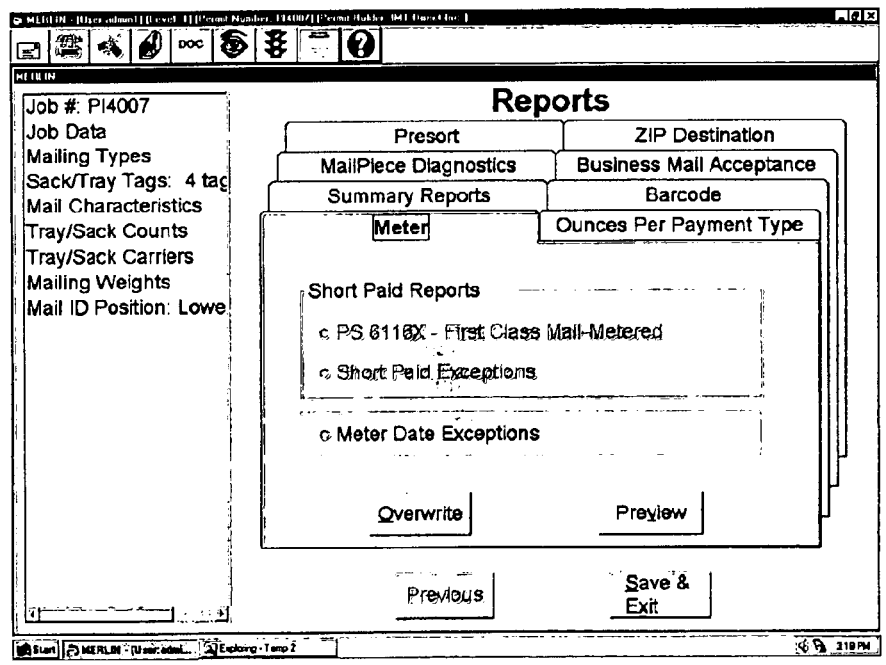

Figure 5-9
Meter Reports Tab

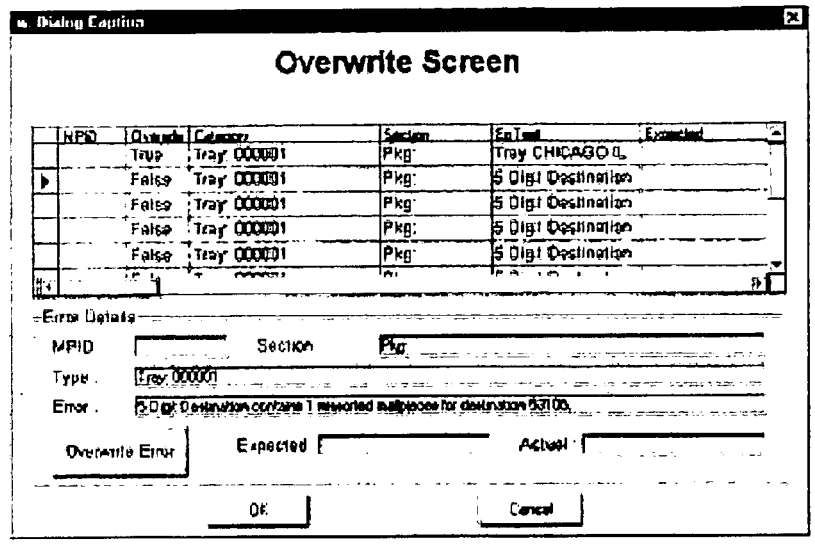

Figure 5-10
Overwrite Screen

Table 5-6
Overwrite Screen

| Field | Function |
| --- | --- |
| Error Display | This area lists the errors found in the report and allows the user to select and overwrite any error found in the report. |
| MPID | Displays the mailpiece identification number of the item selected for the overwrite option. |
| Section | Displays the package number (if applicable) in which the selected mailpiece can be found. |
| Type | Displays the tray number in which the selected mailpiece may be found. |
| Error | Displays the description of the error found on the mailpiece, as described in this report. |
| Expected | This field will only contain information concerning short paid analysis. It displays the amount of postage that was expected for the mailpiece. |
| Actual | This field will only contain information concerning short paid analysis. It displays the actual postage that appears on the mailpiece. |
| Overwrite Error button | Selecting this button causes the selected error to be overwritten. |
| OK button | Selecting this button causes the overwrite screen to close and the Reports screen is available. |
| Cancel button | Selecting this button causes the selected information to clear and the overwrite screen to close. |

| Site Name: Bell&Howell P&DC | Mailing ID: 3092274 | Serial No: MER00-0001 | Ver: 00B658 |

First-Class Metered Mail - Shortpaid Mail Sampling Worksheet
PS 6116X

Permit #: MT123  Mailing Agent: None  Date: 2/20/01

Mailing:
- ● Identical
- ○ Nonidentical

Client:
- ● Single Company
- ○ Multiple Clients/Departments

Mailer:
- ● Owner
- ○ Agent

| | | Sample | | Totals for Identical or Nonidentical Mailing w/Shortpaid Pieces | | | | |
|---|---|---|---|---|---|---|---|---|
| 1 | 2 | 3 | 4 | 5 | 6 | 7 | 8 | 9 |
| Type of Client | Meter Plate Number | Total Pieces Sampled | Total Shortpaid Pieces | Percent (%) of Pcs in Sample Shortpaid (error rate) | Total Postage Due on Shortpaid Pieces in Sample | Average Postage Due (Col 6 / Col 4) | Total Pcs in Mailing / Client / Dept. | Total Postage Due (Col 8 x Col 6 x Col 7) |
| (A) Identical WL | | 193 | 20 | 10.383% | 7.828 | 0.391 | 10000 | 405.596 |
| (B) Nonidentical WL | | 0 | 0 | 0.000% | 0.000 | 0.000 | 0 | 0.000 |

| Sampling Totals | | 193 | 20 | | | | | 405.596 |

If shortpaid(s) found, notify mailer of postage due and give them a copy of shortpaid worksheet.

Disposition of Mailing if you found shortpaid pieces in sample (check all that apply)
- ☐ Mailing accepted, postage due: $405.60
  - Paid by: ☐ Meter Strip
  - ☐ Trust Fund
- ☐ Mailer took back mailing to correct

*Figure 5-11*
*First Class Metered Mail- Short Paid Mail Sampling Worksheet*

*Table 5-7*
*First Class Metered Mail- Short Paid Mail Sampling Worksheet*

| Field | Description |
|---|---|
| Mailer Name | Name of person delivering mail |
| Date | Date the mail was presented at the BMEU/DMU |
| Mailing | Identifies either identical or non-identical mailpiece classification |
| Client | Identifies either Single Company or Multiple Client mailings |
| Mailer | Identifies the mailer as company owner or agent |
| Type of Client | Client classification |
| Meter Plate Number | MERLIN recognized number of client meter |
| Total Pieces Sampled | Number of mailing pieces evaluated with weight and value |
| Total Short Paid Pieces | Number of evaluated mailing pieces that were short paid |
| Percent of Pieces in Sample Short Paid | Percent of total pieces that were short paid |
| Total Postage Due on Short Paid Pieces in Sample | Postage due on short paid pieces only |
| Average Postage Due | Average of postage due from short paid calculation |
| Total Pieces in Mailing / Client / Dept | Total number of pieces in mailing |
| Total Postage Due | Average postage applied to entire mailing |

| Site Name: Bell&Howell P&DC | Mailing ID: 3092274 | Serial No: MER00-0001 | Ver: 00B65B |

Shortpaid Exceptions Report

| | |
|---|---|
| Number of Pieces Fed: | 222 |
| Number of Pieces Sampled: | 193 |
| Number of Pieces Shortpaid: | 20 |

Exceptions Found:

TrayID = 1 :MPID = 18 :Meter Plate Number = 655XX5X - Piece Shortpaid: Metered Weight =1oz Piece Weight =2oz TrayID = 1 :MPID = 19 :Meter Plate Number = XXXXXXX - Piece Shortpaid: Metered Weight =1oz Piece Weight =3oz TrayID = 1 :MPID = 20 :Meter Plate Number = 65XXX5X - Piece Shortpaid: Metered Weight =1oz Piece Weight =3oz TrayID = 1 :MPID = 21 :Meter Plate Number = 6555X57 - Piece Shortpaid: Metered Weight =1oz Piece Weight =3oz TrayID = 1 :MPID = 22 :Meter Plate Number = 6XXX57 - Piece Shortpaid: Metered Weight =1oz Piece Weight =3oz TrayID = 1 :MPID = 23 :Meter Plate Number = 6555557 - Piece Shortpaid: Metered Weight =1oz Piece Weight =3oz TrayID = 1 :MPID = 66 :Meter Plate Number = XXXXXXX - Piece Shortpaid: Metered Weight =1oz Piece Weight =3oz TrayID = 1 :MPID = 67 :Meter Plate Number = XXXXXXX - Piece Shortpaid: Metered Weight =1oz Piece Weight =3oz TrayID = 1 :MPID = 68 :Meter Plate Number = 655555X - Piece Shortpaid: Metered Weight =1oz Piece Weight =3oz TrayID = 2 :MPID = 110 :Meter Plate Number = XXXXXXX - Piece Shortpaid: Metered Weight =1oz Piece Weight =3oz TrayID = 2 :MPID = 112 :Meter Plate Number = 65XX57 - Piece Shortpaid: Metered Weight =1oz Piece Weight =4oz TrayID = 2 :MPID = 113 :Meter Plate Number = XXXXXXX - Piece Shortpaid: Metered Weight =1oz Piece Weight =3oz TrayID = 2 :MPID = 114 :Meter Plate Number = 6555557 - Piece Shortpaid: Metered Weight =1oz Piece Weight =3oz TrayID = 2 :MPID = 115 :Meter Plate Number = 655555X - Piece Shortpaid: Metered Weight =1oz Piece Weight =4oz TrayID = 3 :MPID = 216 :Meter Plate Number = XXXXXXX - Piece Shortpaid: Metered Weight =1oz Piece Weight =3oz TrayID = 3 :MPID = 217 :Meter Plate Number = XXXXXXX - Piece Shortpaid: Metered Weight =1oz Piece Weight =2oz

| Tuesday, February 20, 2001 | Page 1 of 2 |

*Figure 5-12*
*Short Paid Exceptions Report*

*Table 5-8*
*Short Paid Exceptions*

| Field | Description |
|---|---|
| Number of Pieces Fed | Number of pieces fed into MERLIN |
| Number of Pieces Sampled | Number of pieces that were sampled with weight and value |
| Number of Pieces Shortpaid | The number of pieces on which postage is due. |
| Exceptions Found | A single line entry for each short paid exception. Each line entry includes:<br>• Tray ID<br>• Mailpiece ID<br>• Meter Plate Number<br>• Metered Weight<br>• Measured Piece Weight |

*Figure 5-13*
*Meter Date Report*

Table 5-9
Meter Date Report (Summary section)

| Field | Description |
|---|---|
| # Fed | Total number of mailpieces that were ran. |
| Correct Date | Total number of mailpieces that had the correct date. |
| # Read | Number of mailpieces, with good captured information. |
| %Correct Date | Percentage of mailpieces, with good captured information that had a correct meter date. |
| Permit Number | Mailing permit identification number |
| Mailing Date | Date the mail was ran through MERLIN |
| Tray | The tray number of the individual mailpiece |
| MPID | Mailpiece ID number assigned by MERLIN |
| MP Meter Date | Meter Date of each mailpiece |

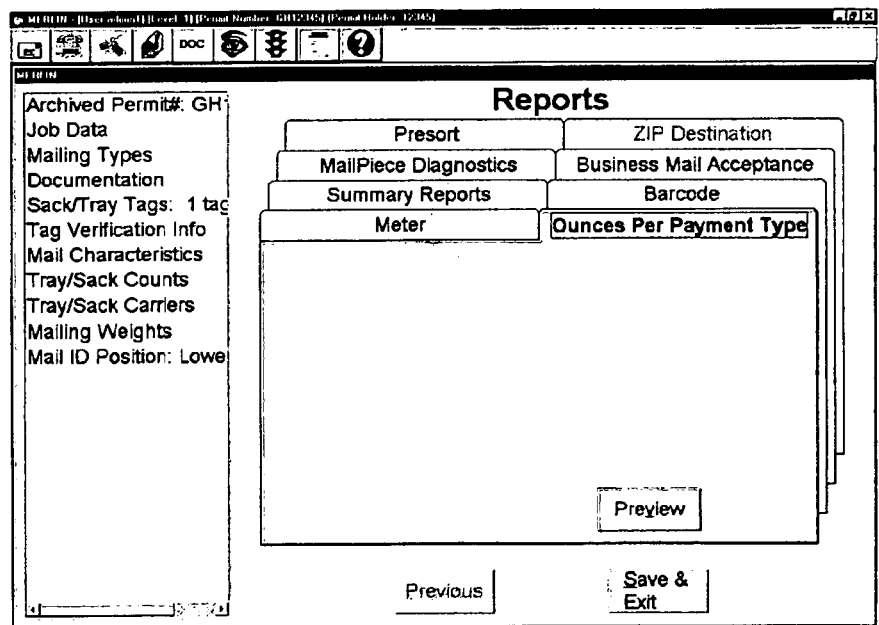

Figure 5-14
Ounces Per Payment Type Report Tab

| Site Name: Bell&Howell P&DC | Mailing ID: 1295735 | Serial No: MER-00-0000 | | Ver: 007668 |
|---|---|---|---|---|
| Payment Method by Ounce Category | | Account Number | GH12345 | |
| Summary Report | | Mailing Date | 01/23/2001 | |
| | | Mailing Time | 16:40 | |
| TrayID | Payment Method | Postage Affixed | Ounce Category | Count |
| 000001 | Metered | Unknown | 1 Oz | 6 |
| 000001 | Metered | 0.243 | 1 Oz | 43 |
| 000001 | Permit | Unknown | 1 Oz | 1 |

Figure 5-15
Payment Method by Ounce Category Summary Report

Table 5-10
Payment Method by Ounce Category Summary Report

| Field | Description |
|---|---|
| Permit Number | Mailing permit identification number |
| Mailing Date | Date the mail was accepted at the BMEU/DMU |
| Mailing Time | Time the mail was accepted at the BMEU/DMU |
| Tray ID | The tray identification number |
| Payment Method | Metered, Stamped, or Permit |
| Postage Affixed | Postage amount per piece |
| Ounce Category | Weight category used to sort mailpieces for statistical purposes |
| Count | Number of mailpieces using a particular payment method, and falling into a particular ounce category |

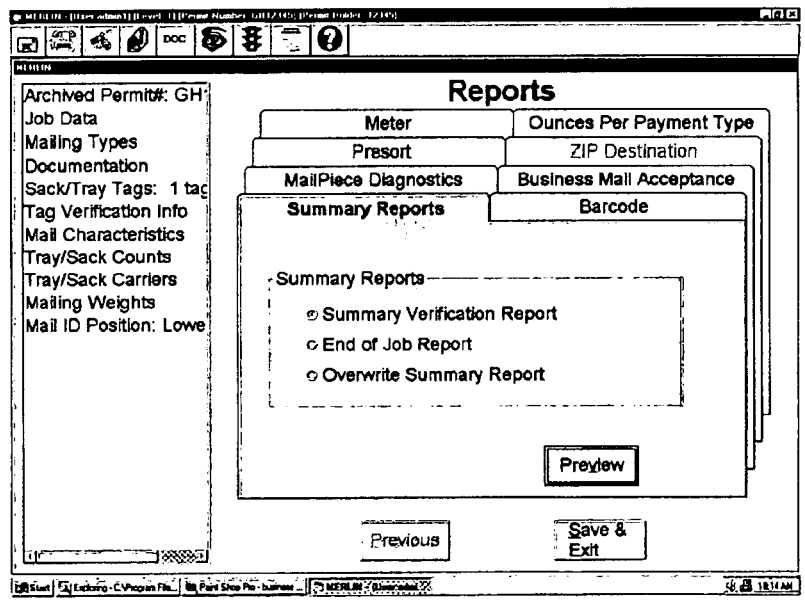

Figure 5-16
Summary Reports Tab

| Site Name: tampa BMEU | Mailing ID: 1403675 | Serial No: MER-00-0028 | Ver: 007384 |

Summary Verification Report

Mailer
- Name of Permit Holder:
- Account Number of Permit Holder:
- Mailing Agent: POSTAL OPTIONS
- Piece Count Declared by Mailer: 1801
- Mailing Class: Standard Class
- Mailing Category: Letters
- Statement Type: 3602N

System
- Date: 07/31/2001
- Time: 11:16:13 AM
- Number of Pieces Sampled: 507
- CASS Cycle Dir: F05

| Verification Conducted | USPS Acceptance Rate | MERLIN Results | MERLIN Accepted | Additional Postage Due |
|---|---|---|---|---|
| Address Accuracy | | 92.2 % | | |
| ECR Sequence | N/A | N/A | N/A | |
| Mailpiece Characteristics | N/A | Accepted | Yes | |
| Piece Count (PS8040X) | less than 1% | 106.1 % | No | N/A |
| PLANET Code | | 0.0 % | | |
| POSTNET Barcode | greater than 90% | 91.7 % | Yes | $0.00 |
| Presort Verification (PS2866X) | less than 5% | 0.0 % | Yes | $0.00 |
| Short Paid (PS6116X) | less than 5% | N/A | N/A | N/A |
| Zip Destination | | N/A | N/A | |

Total Additional Postage Due: $0.00

Tuesday, July 31, 2001 — Page 1

*Figure 5-17*
*Summary Verification Report*

Table 5-11
Summary Verification Report

| Field | Description |
|---|---|
| Name of Permit Holder | Name of business mailer |
| Account Number of Permit Holder | Identification number |
| Mailing Agent | Name of organization responsible for mailing |
| Piece Count Declared by Mailer | Number of pieces that mailer declared |
| Mailing Class | First Class, Standard-A, Periodicals |
| Mailing Category | Letter, Flat |
| Statement Type | Method used for postage |
| Date | Date the mail was run on MERLIN |
| Time | Time the mail was run on MERLIN |
| Number of Pieces Sampled | Number of pieces analyzed by MERLIN |
| CASS Cycle Directory | The CASS directory that MERLIN used for the analysis. |
| Address Accuracy | Percentage of pieces with accurate address to barcode comparison |
| ECR Sequence | Enhanced Carrier Route Sequence provides information about whether a mailing is correctly presorted by carrier route – this field provides the USPS Acceptance Rate, MERLIN Results, Whether MERLIN accepted or rejected the run |
| Mailpiece Characteristics | Based on mailpiece physical characteristics – this field provides USPS Acceptance Rate, MERLIN Results, and whether MERLIN accepted or rejected the run |
| Piece Count (PS8040X) | Based on Piece Count verification – this field provides USPS Acceptance Rate, MERLIN Results, Whether MERLIN accepted or rejected the run, and whether additional postage is due |
| Planet Code | Percentage of pieces with readable PLANET barcodes |
| POSTNET Barcode | Based on POSTNET Readability – this field provides USPS Acceptance Rate, MERLIN Results, Whether MERLIN accepted or rejected the run, and whether additional postage is due |
| Presort Verification (PS2866X) | Based on Presort Verification – this field provides USPS Acceptance Rate, MERLIN Results, Whether MERLIN accepted or rejected the run, and whether additional postage is due |
| Short Paid (PS2866X) | Based on Short Paid verification – this field provides USPS Acceptance Rate, MERLIN Results, Whether MERLIN accepted or rejected the run, and whether additional postage is due |
| ZIP Destination | Based on comparison between declared zip destination and actual – this field provides USPS Acceptance Rate, MERLIN Results, and whether MERLIN accepted or rejected the run |
| Total Additional Postage Due | Additional postage due based on all verification criteria |

| Site Name: Bell&Howell P&DC | Mailing ID: 3092274 | Serial No: MER00-0001 | Ver: 00B65B |

End of Job Report

Job Information

| Mailing Date: | 2/20/01 | Mailing Class: | First Class |
|---|---|---|---|
| Start Time: | 08:39:00 PM | Mailing Category: | Letters |
| Analyzing Complete Time: | 08:49:09 PM | Postage Type: | 3600P-M |
| Operator Name: | maint1 | | |

System Performance

| Pieces Total Count: | 222 | Throughput Unadj Letter | 2690 pcs/hr |
|---|---|---|---|
| Stop Count: | 1 | OCR Readability Results: | 93.2 % |
| Total Stoppage: | 00:00:00 hh:mm:ss | | |

System Utilization Time, hh:mm:ss

| Total: | 00:09:35 | | |
|---|---|---|---|
| Operator Entry: | 00:01:56 | Analysis: | 00:02:16 |
| Transport Run: | 00:04:57 | Review Reports: | N/A |

Verification Summary Results

| Verification | Score, % | Number Errors | Number w/Data | Number Overwritten |
|---|---|---|---|---|
| POSTNET Readability Score: | 94.1 | 13 | 209 | N/A |
| PLANET Readibility Score: | 75.2 | 55 | 167 | N/A |
| Address Accuracy: | 98.6 | 3 | 204 | N/A |
| Meter Dates Wrong: | 000.0 | 209 | 209 | N/A |
| Short Paid: | 10.4 | 20 | 193 | 0 |
| PRD: | 53.1 | N/A | 222 | N/A |
| Result Height: | 100.0 | 0 | 222 | N/A |
| Result Length: | 100.0 | 0 | 222 | N/A |
| Result Thickness: | 100.0 | 0 | 222 | N/A |
| Result Weight: | 98.7 | 3 | 222 | N/A |

| Unique Meter Plate Count: | 50 |
|---|---|

Tuesday, February 20, 2001

*Figure 5-18*
*End of Job Report*

Table 5-12
End of Job Report

| Field | Description |
|---|---|
| Mailing Date | Date the mail was run through MERLIN |
| Start Time | Time MERLIN run was started |
| Analyzing Complete Time | Time MERLIN run was completed |
| Operator Name | User name of operator |
| Mailing Class | First Class, Standard-A, Periodicals |
| Mailing Category | Letter, Flat |
| Postage Type | Method used for postage |
| Pieces Total Count | Total number of pieces in job |
| Stop Count | Number of times the job stopped |
| Total Stoppage | Length of time the job was stopped |
| Throughput Unadj Letter | Rate that MERLIN processed the job in pieces per hour |
| OCR Readability Results | Percent of mailpieces readable by OCR (optical character recognition) |
| POSTNET Readability Score | POSNET barcodes – percentage readable, number of errors, number with data, and number overwritten |
| PLANET Readability Score | PLANET barcodes – percentage readable, number of errors, number with data, and number overwritten |
| Address Accuracy | Address Accuracy – percentage accurately comparable to barcode, number of errors, number with data, and number overwritten |
| Meter Dates Wrong | Percentage of meter dates that were in error |
| Short Paid | Percentage of mailing that was short paid |
| PRD | Print Reflectance Differential- This is the percentage of contrast between the printed barcode and the background that it is printed on. |
| Result Height | Height – percentage of run within allowable tolerance, number that were outside of allowable tolerance, number that were measured, and number overwritten |
| Result Length | Length – percentage of run within allowable tolerance, number that were outside of allowable tolerance, number that were measured, and number overwritten |
| Result Thickness | Thickness – percentage of run within allowable tolerance, number that were outside of allowable tolerance, number that were measured, and number overwritten |
| Result Weight | Weight – percentage of run within allowable tolerance, number that were outside of allowable tolerance, number that were measured, and number overwritten |
| Unique Meter Plate Count | The number of different meter plates that were read by MERLIN. |

| Site Name: Bell&Howell P&DC | Mailing ID: 8883030 | Serial No: MER00-0001 | Ver: 00B65B |

Overwrite Summary Report

| Category | Description |
|---|---|
| Presort Verification | Tray: 000001 Tray CUDAHY WI 53110 only has 58 pcs, 150 minimum. |
| | Overwritten By: maint1     Date Overwritten: 02/20/2001 20:30:18 |

*Figure 5-19*
*Overwrite Summary Report*

Table 5-13
Overwrite Summary Report

| Field | Description |
|---|---|
| Permit Number | Mailing permit identification number |
| Mailing Date | Date the mail was accepted at the BMEU/DMU |
| Category | The category of information that was overwritten |
| Description | A description of the information overwritten |
| Overwritten By | The user name of the person who overwrote the information |
| Date Overwritten | The date the information was overwritten |

Barcode Reports Tab

POSTNET Barcode Readability Report

Table 5-14
Barcode Readability Report (Summary Section)

| Field | Description |
|---|---|
| Permit Number | Mailing permit identification number |
| Mailing Date | Date the mail was accepted at the BMEU/DMU |
| Readability | Percent of mailpieces with a readable barcode |
| Pieces Analyzed | Number of pieces analyzed by MERLIN |

Table 5-15
Barcode Readability Report (Individual mailpiece section)

| Field | Description |
|---|---|
| MPID | Mailpiece ID number assigned by MERLIN |
| Barcode Analysis | A printout of defective barcodes. Problem codes are shown as subscript letters. At the bottom of the page, a legend describes what each problem code means. |

Figure 5-22
PLANET Barcode Readability Report

Table 5-16
Barcode Readability Report (Summary Section)

| Field | Description |
|---|---|
| Permit Number | Mailing permit identification number |
| Mailing Date | Date the mail was accepted at the BMEU/DMU |
| Readability | Percent of mailpieces with a readable barcode |
| Pieces Analyzed | Number of pieces analyzed by MERLIN |

Table 5-17
Barcode Readability Report (Individual mailpiece section)

| Field | Description |
|---|---|
| MPID | Mailpiece ID number assigned by MERLIN |
| PLANET Barcode Location | A printout of defective barcodes. Problem codes are shown as subscript letters. At the bottom of the page, a legend describes what each problem code means. |

| Site Name: Bell&Howell P&DC | Mailing ID: 3092274 | Serial No: MER00-0001 | Ver: 00B65B |

Address Accuracy
(Mailer results based on CASS Cycle Directory listed below.)

| Permit Number: MT123 | # Fed | # Matched | # Read | Percent Matched |
|---|---|---|---|---|
| Mailing Date: 02/20/2001 | 222 | 204 | 207 | 98.6% |
| CASS Cycle Dir: E01 | | | | |

| Tray | MPID | Mailer Applied POSTNET Barcode | Address Lookup |
|---|---|---|---|
| 000001 | 000012 | 53105090353 | 353 INDIAN BEND RD<br>BURLINGTON WI 53105 3903 53 |
| 000002 | 000080 | 53105090353 | 353 INDIAN BEND RD<br>BURLINGTON WI 53105 3903 53 |
| 000003 | 000155 | 53105090353 | 353 INDIAN BEND RD<br>BURLINGTON WI 53105 3903 53 |

Figure 5-23
Address Accuracy Report

Table 5-18
Address Accuracy Report (Summary section)

| Field | Description |
|---|---|
| Permit Number | Mailing permit identification number |
| Mailing Date | Date the mail was accepted at the BMEU/DMU |
| CASS Cycle Directory | The CASS directory that MERLIN used to perform the analysis. |
| # Fed | Number of mailpieces fed during the run being analyzed |
| # Matched | Number of barcode ZIP Codes that matched the printed address |
| # Read | Total number of addresses and barcodes read |
| Percent Matched | Percent of barcode ZIP Codes read, that matched the printed address |

Table 5-19
Address Accuracy Report (Individual mailpiece section)

| Field | Description |
|---|---|
| Tray | The tray number of the individual mailpiece |
| MPID | Mailpiece ID number assigned by MERLIN |
| Mailer Applied POSTNET Barcode | The ZIP Code as determined from the barcode |
| Address Lookup | The address result of the lookup |

| Site Name: Bell&Howell P&DC | Mailing ID: 9763310 | Serial No: MER00-0001 | Ver: 008658 |
|---|---|---|---|

POSTNET Barcode Readability
Adjustment Worksheet
First Class Mail

Mailing Agent: None
Permit #: MUB123
Readability(%): 86.14

| Entry Discount | Rate Claimed | | Pieces Claimed | Adjustment Factor | Pieces Adjustment | Postage Factor | Postage Adjustment |
|---|---|---|---|---|---|---|---|
| None | 3-Digit | LETTER | 5000 | 0.14 | 701 | 0.044 | $ 30.844 |
| None | 5-Digit | LETTER | 5000 | 0.14 | 701 | 0.062 | $ 43.462 |
| | | | | | Total Additional Postage Due: | | $ 74.31 |

Signature of Clerk: _____  Date: _____

Page 1 of 1

Figure 5-24
Barcode Readability Report Adjustment Worksheet

Table 5-20
Barcode Readability Report Adjustment Worksheet

| Field | Description |
|---|---|
| Mailing Agent | Name of the mailing agent claiming the barcoded mail rate |
| Permit # | Mailing permit identification number |
| Readability | Percent of mailpieces with a readable barcode |
| Entry Discount | Discount claimed for mailing |
| Rate Claimed | Rate claimed for each mailing based on barcoding. |
| Pieces Claimed | Number of pieces claimed in mailing |
| Adjustment Factor | Factor by which to adjust the pieces claimed |
| Piece Adjustment | Number of mailpieces adjusted |
| Postage Factor | Postage factor to be applied to piece adjustment |
| Postage Adjustment | Additional postage required based on MERLIN evaluation of barcode readability |
| Total Additional Postage Due | Total of postage adjustments |

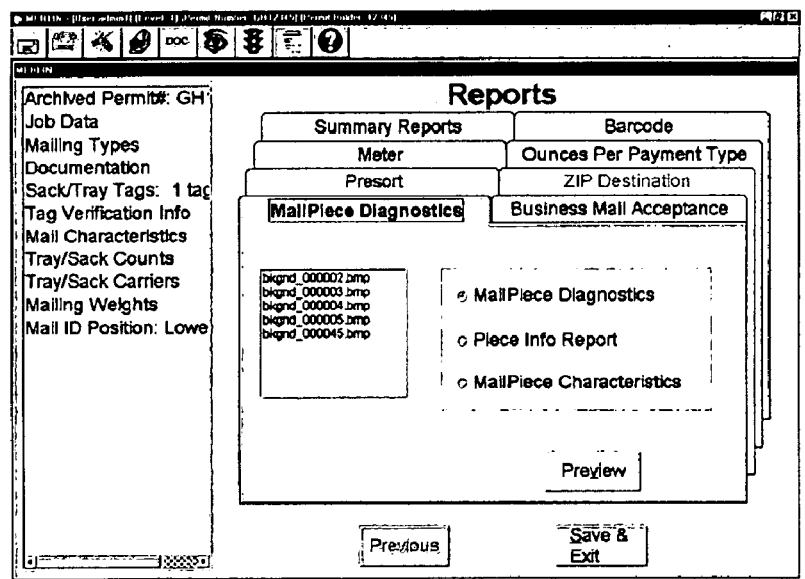

Figure 5-25
Mailpiece Diagnostics Report Tab

Mailpiece Diagnostics Report Screen

Mailpiece Diagnostics Report- Address Components

Table 5-21
Mailpiece Diagnostics- Address Components

| Field | Description |
| --- | --- |
| User Name | The user name of the operator who logged in. |
| Mailer Name | The name of the person who delivered the mail. |
| Permit Number | The permit identification number used for the mailing. |
| Mailing Date | The date the mail was ran on MERLIN |
| Endorsement Line | The endorsement line on the mailpiece as read by MERLIN. |
| CASS Cycle Directory | The CASS directory that MERLIN used to perform the analysis. |
| OCR Data | The information picked up by the OCR. |
| Delivery Address | The delivery address on the mailpiece as read by MERLIN. |
| City | The city from the address block of the mailpiece, as read by MERLIN. |
| State | The state and numeric zip from the address block of the mailpiece, as read by MERLIN. |
| Lookup | The decoded ZIP Code as determined from the POSTNET barcode. |
| Tray/Sack Label Decode Results | The decoded tray or sack label number from which the selected mailpiece came. |
| MPID | The mailpiece identification number assigned to the mailpiece by MERLIN. |
| Mailpiece Type | Either letters, flats or postcards, whichever was selected during the run from which the mailpiece came. |

Figure 5-28
Mailpiece Diagnostics Report- Barcode Components (first page)

| Site Name: Bell&Howell P&DC | Mailing ID: 3092274 | Serial No: MER00-0001 | Ver: 00B65B |

Mailpiece Diagnostics
Barcode Components

A: Bar Too Tall
B: Bar Too Short
C: Bar Too Wide
D: Bar Too Narrow
E: Barcode Position Problem
F: Void (Area without Ink)
G: Extraneous Ink present H: Baseline shift
J: Bar tilt (See note below)
K: Pattern skew (See note below)
L: Bar pitch too close
M: Bar pitch too far
N: Low background reflectance
O: Low print reflectance P: Barcode clearance problem
R: Connected Bars
S: Barcode will not decode
T: Invalid delivery point barcode
U: Bar space too close
V: Bar space too far Note: For a flat size piece disregard attribute if value is between 5 and 10 degrees. No barcode error.

POSTNET Barcode Measurements

|  | Min | Max |  |  |
|---|---|---|---|---|
| Short Bar Height (Inch): | 0.050 | 0.055 | Bars Per Inch: | 22.635 |
| Tall Bar Height (Inch): | 0.130 | 0.135 | Pattern Skew (Degree): | -0.156 |
| Bar Width (Inch): | 0.020 | 0.025 | P R Difference: | 55.0% |
| Bar Space (Inch): | 0.030 | 0.035 | P R Foreground: | 14.0% |
| Baseline Shift (Inch): | - | 0.005 | P R Background: | 69.0% |
| Bar Tilt (Degree): | 0.070 | 1.562 | Barcode Location: | No Error |

PLANET Barcode Measurements

|  | Min | Max |  |  |
|---|---|---|---|---|
| Short Bar Height (Inch): | 0.050 | 0.055 | Bars Per Inch: | 22.635 |
| Tall Bar Height (Inch): | 0.130 | 0.135 | Pattern Skew (Degree): | -0.085 |
| Bar Width (Inch): | 0.020 | 0.025 | P R Difference: | 54.0% |
| Bar Space (Inch): | 0.030 | 0.035 | P R Foreground: | 13.0% |
| Baseline Shift (Inch): | - | 0.005 | P R Background: | 67.0% |
| Bar Tilt (Degree): | 0.010 | 1.302 | PLANET Code Location: | No Error |

Figure 5-29
Mailpiece Diagnostics Report- Barcode Components (second page)

Note: Boxed area represents location identified as containing payment method, separator label, and/or package label.

Mailpiece Diagnostics Report- Physical/Postage Components

Figure 5-31
Mailpiece Characteristics Report

Table 5-22
Mailpiece Characteristics Report (Summary Section)

| Field | Description |
|---|---|
| Mail Class | Class of mailing (First Class, Standard A, etc.) |
| Mail Category (L/C/F) | Type of mail (letter, card, flat) |
| Height | The total number of mailpieces that were within the specified height limit appears under # w/Data, the total number for which MERLIN captured good height information appears under # Good, and the percentage that was good appears under Percent Good. |
| Length | The total number of mailpieces that were within the specified length limit appears under # w/Data, the total number for which MERLIN captured good length information appears under # Good, and the percentage that was good appears under Percent Good. |
| Thickness | The total number of mailpieces that were within the specified thickness limit appears under # w/Data, the total number for which MERLIN captured good thickness information appears under # Good, and the percentage that was good appears under Percent Good. |
| Weight | The total number of mailpieces that were within the specified weight limit appears under # w/Data, the total number for which MERLIN captured good weight information appears under # Good, and the percentage that was good appears under Percent Good. |
| Permit Number | Mailing permit identification number |
| Mailing Date | Date the mail was accepted at the BMEU/DMU |

Table 5-23
Mailpiece Characteristics Report (Individual mailpiece section)

| Field | Description |
|---|---|
| Tray | The tray number of the individual mailpiece |
| MPID | Mailpiece ID number assigned by MERLIN |
| Height | Actual height of mailpiece. If mailpiece is within specification, the height information is blank. Allowable height limits displayed at top of column. |
| Length | Actual length of mailpiece. If mailpiece is within specification, this field is blank. Allowable length limits displayed at top of column. |
| Thickness | Actual thickness of mailpiece. If mailpiece is within specification, this field is blank. Allowable thickness limits displayed at top of column. |
| Weight | Actual weight of mailpiece. If mailpiece is within specification, this field is blank. Allowable weight limits displayed at top of column. |

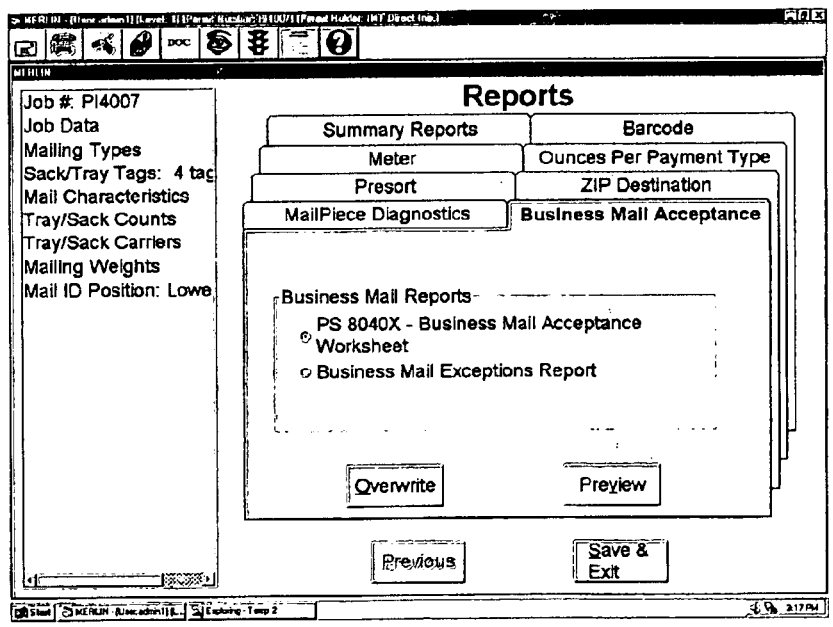

Figure 5-32
Business Mail Acceptance Report Tab

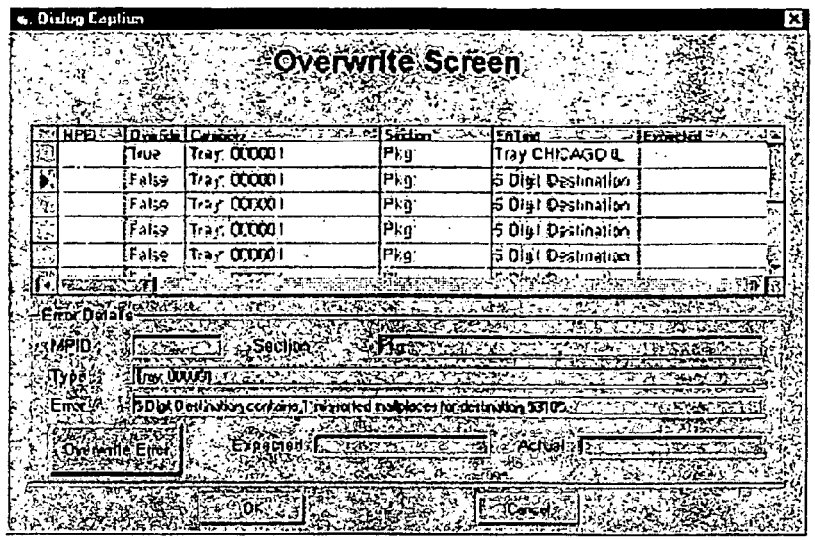

Figure 5-33
Overwrite Screen

Table 5-24
Overwrite Screen

| Field | Function |
|---|---|
| Error Display | This area lists the errors found in the report and allows the user to select and overwrite any error found in the report. |
| MPID | Displays the mailpiece identification number of the item selected for the overwrite option. |
| Section | Displays the package number (if applicable) in which the selected mailpiece can be found. |
| Type | Displays the tray number in which the selected mailpiece may be found. |
| Error | Displays the description of the error found on the mailpiece, as described in this report. |
| Expected | This field will only contain information concerning short paid analysis. It displays the amount of postage that was expected for the mailpiece. |
| Actual | This field will only contain information concerning short paid analysis. It displays the actual postage that appears on the mailpiece. |
| Overwrite Error button | Selecting this button causes the selected error to be overwritten. |
| OK button | Selecting this button causes the overwrite screen to close and the Reports screen is available. |
| Cancel button | Selecting this button causes the selected information to clear and the overwrite screen to close. |

| Site Name: Bell&Howell P&DC | Mailing ID: 8883030 | Serial No: MER00-0001 | Ver: 00865B |

Business Mail Acceptance Worksheet
PS8040X

Part 1 - Weight Sheet

Date: 2/20/01
Permit #: MT123
Permit Holder: B&H Presort
Mailing Agent: None

1. Total (Gross) USPS Weight: 428.00 lbs.

Type and Amount of Tare Weight

| Sacks, Trays and Pallets Only (2) | | | Rolling Stock and All Others (3) | | |
|---|---|---|---|---|---|
| a. Type | b. No. | c. Weight | a. Type | b. No. | c. Weight |
| 2 Foot Sleeve | 10 | 10.00 | Cart/Hamper | 1 | 150.00 |
| 2 Foot Cardboard | 10 | 10.00 | | | |
| 1 Foot Sleeve | 10 | 5.00 | | | |
| 1 Foot Cardboard | 10 | 6.00 | | | |
| 4.a Total: | 31 | | 4.b Total: | 150 | |

5. Net Weight: 247.00 lbs.
   (Line 1 - (Line 4.a + Line 4.b))
6. Tare Weight from Line 4.a: 31.00 lbs.
7. Tare Correction Factor: 3.10 lbs.
   (0.0 or 0.1 x line 6)
8. Adjusted Net Weight (line 5 - line 7): 243.90 lbs.

Part 2 - 1% Acceptable Count

A. Piece Count

| | No Tare Correction | Tare Correction | |
|---|---|---|---|
| 1. USPS Piece Weight: | 0.0243 | 0.0243 | lbs. |
| 2. USPS Net Weight: (Part1, Line 8) | 247.00 | 243.90 | lbs. |
| 3. USPS Piece Count: (A2 divided by A1) | 10165 | 10037 | pcs. |
| 4. Pieces declared by Mailer: | 10000 | 10000 | pcs. |
| 5. Difference (A3 - A4): | 165 | 37 | pcs. |
| 6. Percentage of Difference: (A5 divided by A3 x 100) | 1.623 | 0.369 | % |

7. Is Percentage of Difference less than or equal to 1%?
   ☒ Yes  ☐ No
   a. If yes, accept mailer's piece count.
   b. If no, proceed to C.

B. Pound Rate

1. USPS Net Weight: 0 lbs.
   (Part 1, Line 8)
2. Pounds declared by Mailer: 0 lbs.
3. Difference (B1 - B2): 0.000 lbs.
4. Percentage of Difference: 0.000 %
   (B3 divided by B1 x 100)
5. Is Percentage of Difference less than or equal to 1%?
   ☐ Yes  ☐ No
   a. If yes, accept mailer's declared pounds.
   b. If no, proceed to C.

C. Percentage of Difference exceeds 1%.

Give mailer options:
1. Correct or withdraw the mailing. Complete Part 3.
2. Adjust postage statement to USPS Piece Count/USPS Net Weight. Complete Part 3. (If mailer chooses this option, but under protest, remind the mailer that a written appeal must be filed within 15 days according to Domestic Mail Manual.)

Tuesday, February 20, 2001

*Figure 5-34*
*Business Mail Acceptance Worksheet*

*Table 5-25*
*Business Mail Acceptance Worksheet*

| Field | Description |
|---|---|
| Date | Date the mail was presented at the BMEU/DMU |
| Permit No. | Identification number |
| Permit Holder | Name of business mailer |
| Mailing Agent | Name of person delivering mail |
| Total USPS Weight | Weight of bulk mail delivery including sacks, trays, and pallets |
| Adjusted Net Weight Calculation | Adjusted Net Weight = Total USPS Weight - Sacks, trays, and pallets - rolling stock - (tare weight * tare weight correction factor) |
| Piece Count Percentage Calculation | Piece Count Percentage = [(USPS Net Weight 4 USPS Piece Weight) - Pieces declared by mailer]4 (USPS Net Weight 4 USPS Piece Weight) * 100 |
| Pound Rate Calculation | Pound Rate = (USPS Net Weight - Weight declared by mailer) 4 USPS Net Weight * 100 |
| Percentage of Difference Exceeds 1% | Statement explaining mailer options to correct mailing or withdraw mailing |

| Site Name: Bell&Howell P&DC | Mailing ID: 8883030 | Serial No: MER00-0001 | Ver: 00865B |
|---|---|---|---|

Business Mail Exceptions Report

Average Weight: 0.389 (Oz)

| MPID | Tray Number | Package | Measured Weight,(Oz) |
|---|---|---|---|
| 000042 | 000001 | 000001 | 0.763 |
| 000043 | 000001 | 000001 | 1.151 |
| 000044 | 000001 | 000001 | 0.760 |

Note: *Pieces may be Non-Identical or Doubles. Items Excluded from PS8040X Report.*

Tuesday, February 20, 2001

*Figure 5-35*
*Business Mail Exceptions Report*

Table 5-26
Business Mail Doubles Exception Report (Summary section)

| Field | Description |
|---|---|
| Average Weight | Average weight of all samples |

Table 5-27
Mailpiece Doubles Exception Report (Sorted information section)

| Field | Description |
|---|---|
| MPID | Mailpiece ID number assigned by MERLIN. |
| Tray Number | The tray identification number |
| Package | Number of the package |
| Measured Weight | Measured mailpiece weight in ounces |

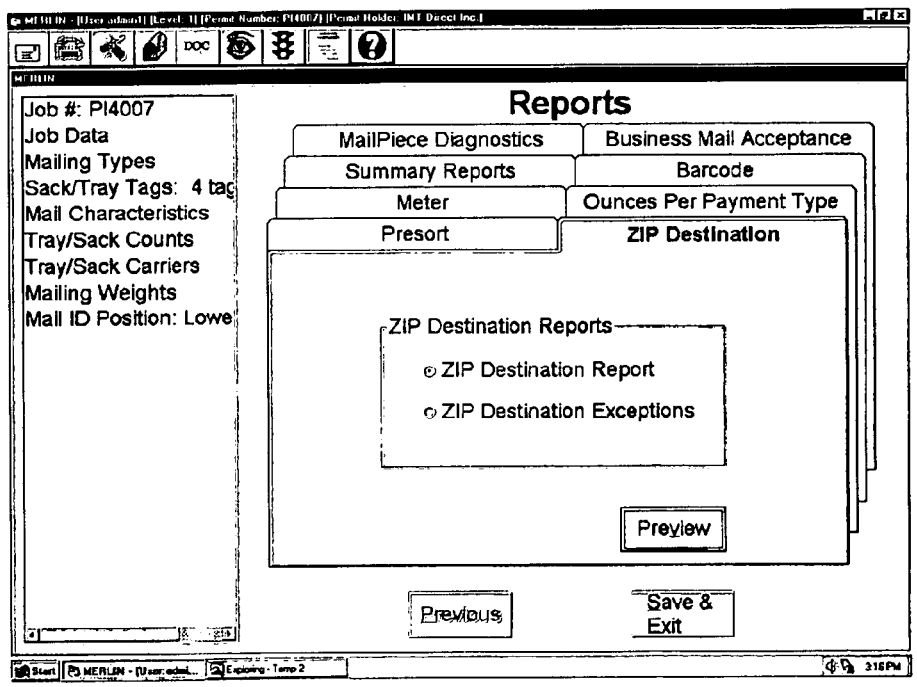

Figure 5-36
ZIP Destination Reports Tab

| Site Name: Bell&Howell P&DC | Mailing ID: 5981953 | Serial No: MER00-0001 | Ver: 00B65B |

ZIP Destination Report

Permit Number: MT123...
Mailing Date: 02/20/2001
Pieces Fed: 240

Destination
MILWAUKEE WI 531...
FCM LTRS 3D BC

| Total Count | Number Found | Number Declared | Percent Error |
|---|---|---|---|
| Total Pieces | 240 | 200 | 20.0% |

| Indicia Type | Number Found | Number Declared | Percent Error |
|---|---|---|---|
| None | 10 | 0 | 100.0% See exception report. |
| Precanceled | 55 | 50 | 10.0% |
| Metered | 125 | 100 | 25.0% |

| Indicia Amount | Number Found | Number Declared | Percent Error |
|---|---|---|---|
| 0.243 | 109 | 75 | 45.3% |
| 0.100 - Precan | 55 | 50 | 10.0% |

| Indicia By Weight | Number Found | Number Declared | Percent Error |
|---|---|---|---|
| Precanceled 1 Oz | 55 | 50 | 10.0% |
| Permit 1 Oz | 50 | 0 | 100.0% See exception report. |
| Metered 1 Oz | 124 | 75 | 65.3% |
| Metered 0 Oz | 1 | 0 | 100.0% See exception report. |

*Figure 5-37*
*Zip Destination Report (Page 1)*

| Site Name: Bell&Howell P&DC | Mailing ID: 5981953 | Serial No: MER00-0001 | Ver: 00B65B |

ZIP Destination Report

Permit Number: MTI123
Mailing Date: 02/20/2001
Pieces Fed: 240

Mail Weight

| | Number Found | Number Declared | Percent Error |
|---|---|---|---|
| 1 Oz | 239 | 125 | 91.2% |
| 0 Oz | 1 | 0 | 100.0% See exception report. |

*Figure 5-38*
*ZIP Destination Report (Page 2)*

Table 5-28
ZIP Destination Report

| Field | Description |
|---|---|
| Permit number | Mailing permit identification number |
| Mailing Date | Date the mail was run through MERLIN |
| Pieces Fed | The number of mailpieces that were fed through MERLIN |
| Destination | The address and contents of the mail as entered from the tray tag |
| Number Found | The number of mailpieces MERLIN counted for each category |
| Number Declared | The number of mailpieces the mailer claimed for each category |
| Percent Error | The percentage of mailpieces that do no match the mailers claims |
| Total Count | The total number of mailpieces in the sample |
| Indicia Type | The type of postage indicia that was encountered in the mailing sample. This area can be broken down into different indicia types. |
| Indicia Amount | The amount of postage per each type of indicia |
| Indicia by Weight | All indicia that were encountered in the mailing sample are broken down by weight categories |
| Mail Weight | The weight categories that were encountered in the mailing |

| | |
|---|---|
| Site Name: Bell&Howell P&DC | Mailing ID: 5981953　Serial No: MER00-0001　Ver: 00B658 |

ZIP Destination Exceptions　Permit Number: MT123　Mailing Date: 02/20/2001

Destination

MILWAUKEE WI 531
FCM LTRS 3D BC

| | |
|---|---|
| Indicia Type Metered | 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125 |
| Indicia Type None | 231, 232, 233, 234, 235, 236, 237, 238, 239, 240 |
| Indicia Type Precanceled | 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230 |
| Indicia Amount 0.100 - Precan | 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230 |
| Indicia Amount 0.243 | 1, 2, 4, 5, 6, 7, 8, 9, 10, 11, 12, 13, 15, 16, 17, 18, 20, 21, 23, 24, 25, 26, 27, 29, 32, 33, 35, 36, 37, 38, 39, 40, 41, 42, 43, 44, 45, 46, 47, 48, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 85, 86, 87, 88, 89, 91, 92, 93, 95, 96, 97, 98, 99, 100, 101, 102, 103, 104, 105, 106, 107, 108, 109, 110, 111, 113, 114, 115, 117, 118, 119, 120, 121, 122, 124, 125 |
| Indicia By Weight - Metered 0 Oz | 98 |
| Indicia By Weight - Metered 1 Oz | 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 99, 100, 101, 102, 103, 104, 105, 106, 107, 108, 109, 110, 111, 112, 113, 114, 115, 116, 117, 118, 119, 120, 121, 122, 123, 124, 125 |
| Indicia By Weight - Permit 1 Oz | 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175 |

Figure 5-39
ZIP Destination Exceptions Report (Page 1)

| Site Name: Bell&Howell P&DC | Mailing ID: 5981953 | Serial No: MER00-0001 | Ver: 00B65B |
|---|---|---|---|

ZIP Destination Exceptions  Permit Number: MIT123  Mailing Date: 02/20/2001

| | |
|---|---|
| Indicia By Weight - Precanceled 1 Oz | 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230 |
| Mail Weight - 0 Oz | 98 |
| Mail Weight - 1 Oz | 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240 |

*Figure 5-40*
*ZIP Destination Exceptions Report (Page 2)*

Table 5-29
ZIP Destination Exceptions Report

| Field | Description |
|---|---|
| Permit Number | Mailing permit identification number |
| Mailing Date | Date the mail was run through MERLIN |
| Destination | The address and contents of the mail |
| Indicia Type | The mailpiece ID numbers of each item that falls within each indicia type category are listed. |
| Indicia Amount | The mailpiece ID numbers of each item that falls within each indicia amount category are listed. |
| Indicia by Weight | The mailpiece ID numbers of each item that falls within each indicia by weight category are listed. |
| Mail Weight | The mailpiece ID numbers of each item that falls within each mail weight category are listed. |

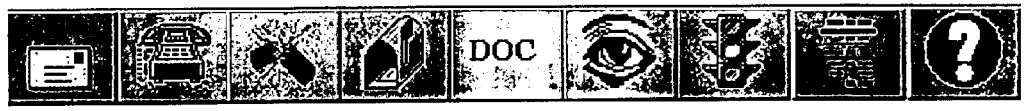

Figure 5-41
MERLIN Toolbar

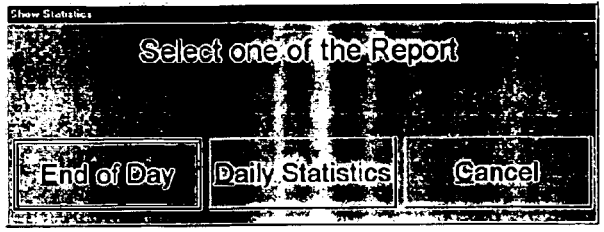

*Figure 5-42*
*Statistics Reports Pop Up Window*

Table 5-30
Statistics Reports Pop Up Window

| Field | Function |
| --- | --- |
| End of Day button | Selection of this button advances the user to the End of Day report screen. |
| Daily Statistics button | Selection of this button advances the user to the Daily Statistics report screen. |
| Cancel button | Selection of this button returns the user to the screen from which the toolbar icon was selected. |

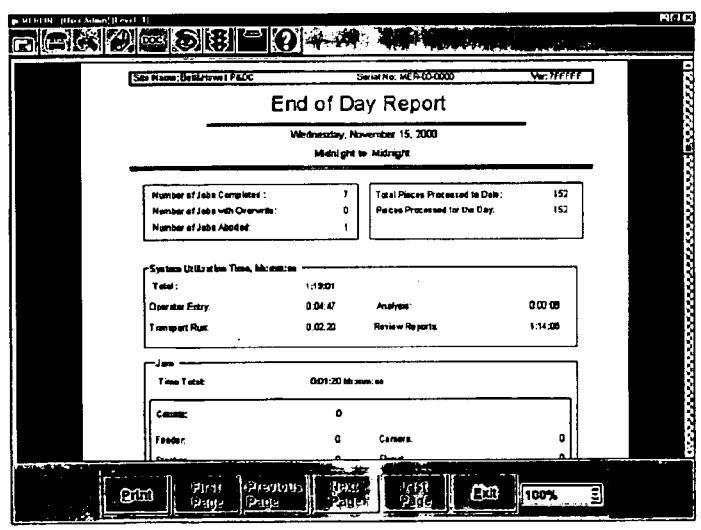

*Figure 5-43*
*End of Day Report Screen*

*Table 5-31*
*End of Day Report Screen*

| Field | Function |
|---|---|
| Print button | Selection of this button causes the End of Day report to be printed. |
| First Page button | Selection of this button returns the user to the first page of the End of Day report. (This button is only active if the End of Day report is longer than one page.) |
| Previous Page button | Selection of this button returns the user to the preceding page in the End of Day report. (This button is only active if the End of Day report is longer than one page.) |
| Next Page button | Selection of this button advances the user to the next page of the End of Day report. (This button is only active if the End of Day report is longer than one page.) |
| Last Page button | Selection of this button advances the user to the last page of the End of Day report. (This button is only active if the End of Day report is longer than one page.) |
| Exit button | Selection of this button returns the user to the screen from which the toolbar icon was selected. |
| Size drop down menu | Allows the user to change the size of the report in the window. |

| Site Name: Bell&Howell P&DC | Serial No: MER-00-0000 | Ver: 00885D |

End of Day Report

Tuesday, February 06, 2001

Midnight to Midnight

| Number of Jobs Completed: | 3 | Total Pieces Processed to Date: | 7397 |
| Number of Jobs with Overwrite: | 0 | Pieces Processed for the Day: | 127 |
| Number of Jobs Aborted: | 4 | | |

System Utilization Time, hh:mm:ss

| Total: | 00:26:47 | | |
| Operator Entry: | 00:06:25 | Analysis: | 00:05:04 |
| Transport Run: | 00:04:58 | Review Reports: | 00:10:20 |

Fault

Time Total: 00:00:00 hh:mm:ss

| Counts: | 0 | | |
| Feeder: | 0 | Camera: | 0 |
| Stacker: | 0 | Flyout: | 0 |
| Scale: | 0 | Printer: | 0 |

Throughput Average Unadjustable, (pcs/hr)

| Letter: | 0 | Card: | 0 |
| Flat: | 0 | Manual: | 0 |

Wednesday, February 07, 2001 — Page 1 of 1

*Figure 5-44*
*End of Day Report*

*Table 5-32*
*End of Day Report*

| Field | Function |
|---|---|
| Number of Jobs Completed | The number of jobs completed since midnight |
| Number of Jobs with Overwrite | The number of jobs during the 24 hour period in which the overwrite option was used |
| Number of Jobs Aborted | The number of jobs started, then discontinued without completing, since midnight |
| Total Pieces Processed to Date | The total pieces processed on the machine since it was last reset. |
| Pieces Processed for the Day | The total number of mailpieces processed since midnight. |
| Total, System Utilization Time | The total time system was in operation since the last time the count was reset on the Pieces Processed screen in Maintenance Mode. |
| Operator Entry, System Utilization Time | The amount of time spent in evaluation mode screens, entering data. |
| Transport Run, System Utilization Time | The amount of time that the transport was running. |
| Analysis, System Utilization Time | The amount of time required to analyze data. |
| Review Reports, System Utilization Time | The amount of time that was spent with report screens open. |
| Fault, Time Total | The amount of time that the machine registered a fault condition. |
| Fault Counts | The number of faults registered. |
| Feeder, Fault Counts | The number of faults registered from the Feeder. |
| Stacker, Fault Counts | The number of faults registered from the Stacker. |
| Scale, Fault Counts | The number of faults registered from the Scale. |
| Camera, Fault Counts | The number of faults registered from the Camera. |
| Flyout, Fault Counts | The number of flyouts that occurred. |
| Printer, Fault Counts | The number of printer faults that occurred. |
| Letter, Throughput Average Unadjustable | The average number of letters ran. |
| Flat, Throughput Average Unadjustable | The average number of flats ran. |
| Card, Throughput Average Unadjustable | The average number of postcards ran. |
| Manual, Throughput Average Unadjustable | The average number of hand fed items. |

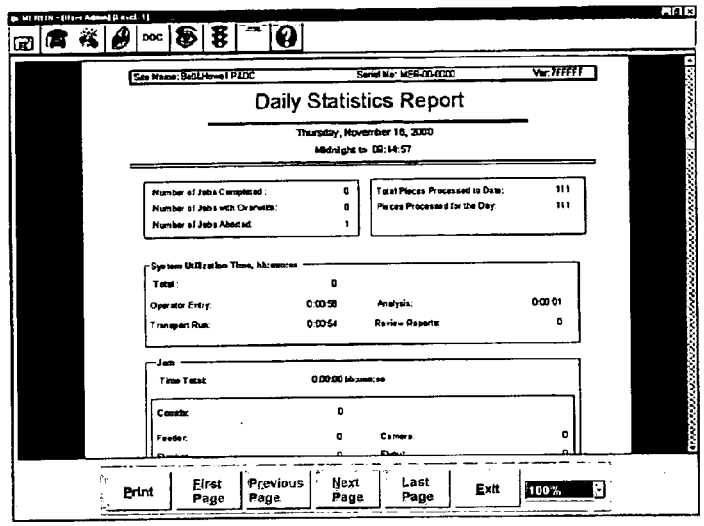

Figure 5-45
Daily Statistics Report Screen

Table 5-33
Daily Statistics Report Screen

| Field | Function |
|---|---|
| Print button | Selection of this button causes the Daily Statistics report to be printed. |
| First Page button | Selection of this button returns the user to the first page of the Daily Statistics report. (This button is only active if the Daily Statistics report is longer than one page.) |
| Previous Page button | Selection of this button returns the user to the preceding page in the Daily Statistics report. (This button is only active if the Daily Statistics report is longer than one page.) |
| Next Page button | Selection of this button advances the user to the next page of the Daily Statistics report. (This button is only active if the Daily Statistics report is longer than one page.) |
| Last Page button | Selection of this button advances the user to the last page of the Daily Statistics report. (This button is only active if the Daily Statistics report is longer than one page.) |
| Exit button | Selection of this button returns the user to the screen from which the toolbar icon was selected. |
| Size drop down menu | Allows the user to change the size of the report in the window. |

| Site Name: Bell&Howell P&DC | Serial No: MER-00-0000 | Ver: 00885D |

Daily Statistics Report

Wednesday, February 07, 2001

Midnight to 10:24:12

---

Number of Jobs Completed :    0

Number of Jobs with Overwrite:    0

Number of Jobs Aborted:    0

Total Pieces Processed to Date:    7397

Pieces Processed for the Day:    0

System Utilization Time, hh:mm:ss

| Total: | 0 | | |
|---|---|---|---|
| Operator Entry: | 0 | Analysis: | 0 |
| Transport Run: | 0 | Review Reports: | N/A |

Fault

Time Total:    0 hh:mm:ss

| Counts: | 0 | | |
|---|---|---|---|
| Feeder: | 0 | Camera: | 0 |
| Stacker: | 0 | Flyout: | 0 |
| Scale: | 0 | Printer: | 0 |

Throughput Average Unadjustable, (pcs/hr)

| Letter: | 0 | Card: | 0 |
|---|---|---|---|
| Flat: | 0 | Manual: | 0 |

Wednesday, February 07, 2001

*Figure 5-46*
*Daily Statistics Report*

AUTOMATIC SYSTEM FOR VERIFYING ARTICLES CONTAINING INDICIA THEREON

This is a continuation in part application of U.S. patent application Ser. No. 08/909,640 filed Aug. 12, 1997, now U.S. Pat. No. 6,311,892, issued Nov. 6, 2001.

FIELD OF THE INVENTION

This invention relates generally to a method and system for reviewing information printed on relatively flat articles, and for gathering and processing information, such as weight and thickness, concerning these articles, and is more particularly directed toward automatic verification of mailpiece attributes such as postage and address information for articles to be mailed.

BACKGROUND OF THE INVENTION

Many corporations and organizations disseminate information and advertising material through the mail. In order to minimize the costs associated with this type of mailing, the United States Postal Service (USPS) offers bulk mailing rates that result in decreased cost of mailing for each piece of mail. Certain types of preprocessing by bulk mailing organizations, such as presorting of bulk mail into lots by ZIP code, helps the USPS in mail sorting and leads to further discounts in the cost of mailing for bulk mailing organizations.

Of course, because of the large volume of bulk mail, the USPS would lose considerable revenue if bulk mailing organizations failed to comply strictly with their presorting obligations but still tried to take advantage of lower postal rates. It is also possible, through error, that a bulk mailer may apply insufficient metered postage to articles of mail. In addition, the USPS must have some form of quality control and verification to ensure that bulk mailers's presort efforts are accurate, so that improperly sorted bulk mail does not slow down the operation of USPS sorting activities.

Traditionally, this verification process is performed manually (with the exception of barcode verification). This manual verification process is very labor intensive and prone to error. Accordingly, a need arises for an automated verification system that is capable of processing large volumes of mail with speed and accuracy, and that maintains proper records relating to each bulk mailer for which verification operations are conducted.

SUMMARY OF THE INVENTION

These needs and others are satisfied by the verification apparatus of the present invention. In accordance with the invention, apparatus for automatically acquiring and verifying, relative to pre-established rules, information affixed to relatively flat articles transported along a transport path comprises weighing means for measuring weight of articles being processed, image acquisition means for acquiring a representation of indicia appearing on an article, processing means for recognition of the indicia appearing on an article, and processing means for verifying acquired data against the preestablished rules.

The apparatus may further comprise infeed means for transporting the articles from an input stage to subsequent processing stages. The infeed means may comprise an infeed conveyor mechanism that singulates articles for subsequent processing.

In accordance with one aspect of the invention, the weighing means comprises an in-line scale that weighs articles individually. The apparatus may further comprise identification printing means for applying numeric identification to at least some of the articles. The printing means may comprise an ink jet print head disposed along the transport path.

In one form of the invention, the image acquisition means comprises a CCD camera and illumination means. The illumination means comprises a plurality of support structures housing light-directing fibers.

In another aspect of the invention, the processing means for recognition of the indicia appearing on an article returns postage information relating to postage type, wherein postage type is selected from the group of postage types consisting essentially of meter, permit, and stamp. The processing means for recognition of the indicia appearing on an article may return postage value, postage class, address information, and various kinds of barcode information such as barcode decode value and barcode print quality information. Both the processing means for recognition of indicia appearing on an article and the processing means for verifying acquired data may comprise a microcomputer.

In yet another aspect of the invention, the apparatus may further comprise stacking means for re-collecting articles. In general, the articles disposed along the transport path are arranged in an original order and orientation, and the stacking means re-collects the articles in the original order and orientation.

In still another form of the invention, the pre-established rules may include a number of parameters such as bar code print quality, compatibility of bar code decode value and address information, weight restrictions, postage type restrictions, postage value restrictions, postage class restrictions, and destination sort requirements. Sort requirements may be valid for a current sort database, or for one or more prior databases.

In still another aspect of the present invention, verification results are printed as reports in a predetermined format. The apparatus may further comprise scanning means for automatic reading of bar codes associated with groups of articles.

In yet another form of the invention, apparatus for automatically acquiring, storing, and verifying indicia affixed to relatively flat articles comprises infeed means for transporting articles from an input stage to subsequent processing stages, weighing means for measuring weight of articles being processed, printing means for affixing identifying indicia to each article, image acquisition means for acquiring a representation of selected indicia appearing on each article, control processor means for controlling acquisition, storage, and verification, and image processing means, in communication with the control processing means, for synchronization of acquisition, storage, and verification.

The infeed means preferably comprises an infeed conveyor mechanism that singulates articles for subsequent processing. The weighing means may comprise an inline scale that weighs each article individually, and the printing means comprises an ink jet print head disposed proximate to the image acquisition means. The image acquisition means preferably comprises a CCD camera and illumination means.

In one form of the invention, the illumination means comprises a plurality of support structures housing light directing fibers. The control processor means comprises a microcomputer controller in communication with the image processing means, while the control processor means communicates with the image processing means via a serial communications protocol. The image processing means is preferably a microprocessor controller in serial communication with the control processor means.

In accordance with one aspect of the invention, apparatus for processing and verifying indicia disposed upon articles to be mailed comprises an infeed magazine in communication with a transport mechanism defining a transport path for the articles, a weighing station receiving articles from the transport mechanism and weighing each article individually, an ink jet printer disposed along the transport path, the ink jet printer applying a numeric identification to each article, a camera unit positioned along a scanning locus that scans the indicia disposed on each article and stores image information in an associated memory, an illumination mechanism associated with the camera unit, providing illumination directed toward the scanning locus, and a control processor and an image processor interconnected by a serial communication link, the control and image processors synchronizing data acquisition, storage, and comparison for verification of indicia disposed upon the articles.

In one form of the invention, the serial communication link comprises a bi-directional serial link over which commands, status messages, and data packets are exchanged. The bi-directional serial link comprises an RS-232 serial link at approximately 19,200 baud. Serial messages are exchanged over the serial communication link, and each serial message begins with a predetermined start character and ends with a predetermined stop character. Preferably, the start character and stop character are 1 byte ASCII characters.

In yet another aspect of the invention, each serial message includes cyclic redundancy check information and a sequence number. Each message is acknowledged by the recipient through transmission of an acknowledgment message when the message is received correctly, and each incorrectly received message causes a negative acknowledgment message to be transmitted. Preferably, the sender resends a message at least once if an acknowledgment message is not received within a predetermined time. Each acknowledgment message includes the sequence number.

Further objects, features, and advantages of the present invention will become apparent from the following description and drawings.

BRIEF DESCRIPTION OF THE DRAWINGS

FIG. 2 is a block diagram of an automatic verification system in accordance with the present invention illustrating interconnection of system elements;

FIG. 3 is a table depicting a serial message format suitable for intercommunication in the automatic verification system of FIG. 2;

FIG. 4 is a table showing permissible message types under the serial format depicted in FIG. 3; and FIGS. 5-1 to 5-46, and TABLES 5-1 to 5-33 illustrate the various reports which are generated by the present invention.

DETAILED DESCRIPTION OF THE INVENTION

In accordance with the present invention, an automatic verification system is described that provides distinct advantages when compared to verification processes of the prior art. The invention can best be understood with reference to the accompanying drawing figures.

Figure 1:
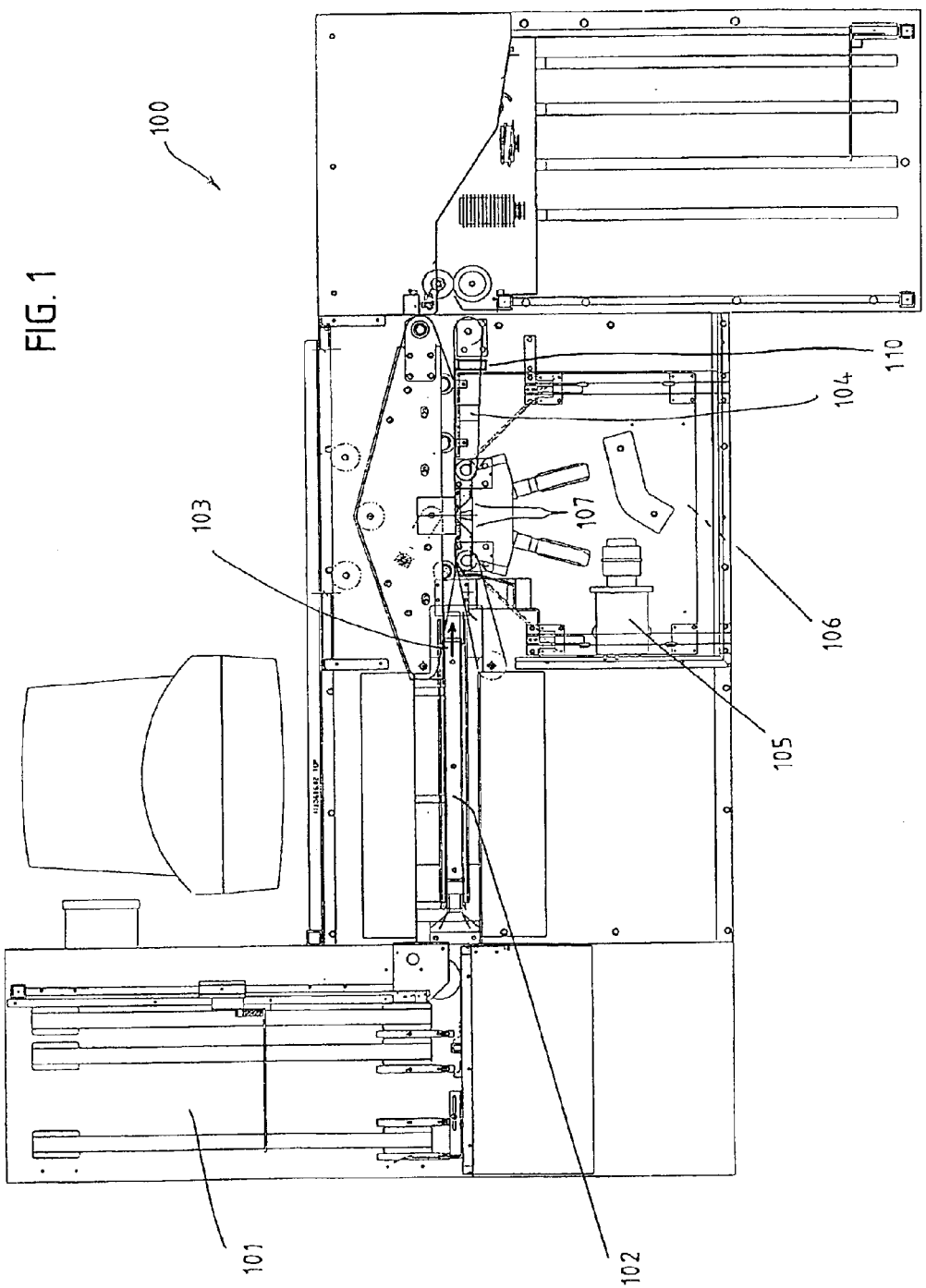
FIG. 1 illustrates the components of an automatic verification system in accordance with the present invention.

The automatic verification system of FIG. 1, generally depicted by the numeral 100, has a capacity to accommodate one full (two-foot) letter tray of mail, and will feed trays of either letter or flat mail in excess of 6,000 pieces per hour. The infeed magazine 101 that provides this capability will process one tray of mail per run. From the feeder 101, each mailpiece proceeds into a scale/settling station 102. This station 102 weighs each piece of mail individually, and then correctly registers the bottom edge of the mailpiece onto an associated transport plate.

Supported by pinch belts, each mailpiece proceeds along the transport path 103, where a 15-inch, high-resolution camera 105 captures an image of the piece for further processing. An ink jet printer 104 is then used to spray a numeric identification (ID) on each piece. Each mailpiece also proceeds past a thickness detector 110 which determines the thickness of each mailpiece, or alternatively an over/under thickness limit, as is known in the art. The piece is then stacked in its original order and orientation in an output device or stacker, while an intelligent tracking system ensures quality and accuracy of inspection.

Figures 1, 5:
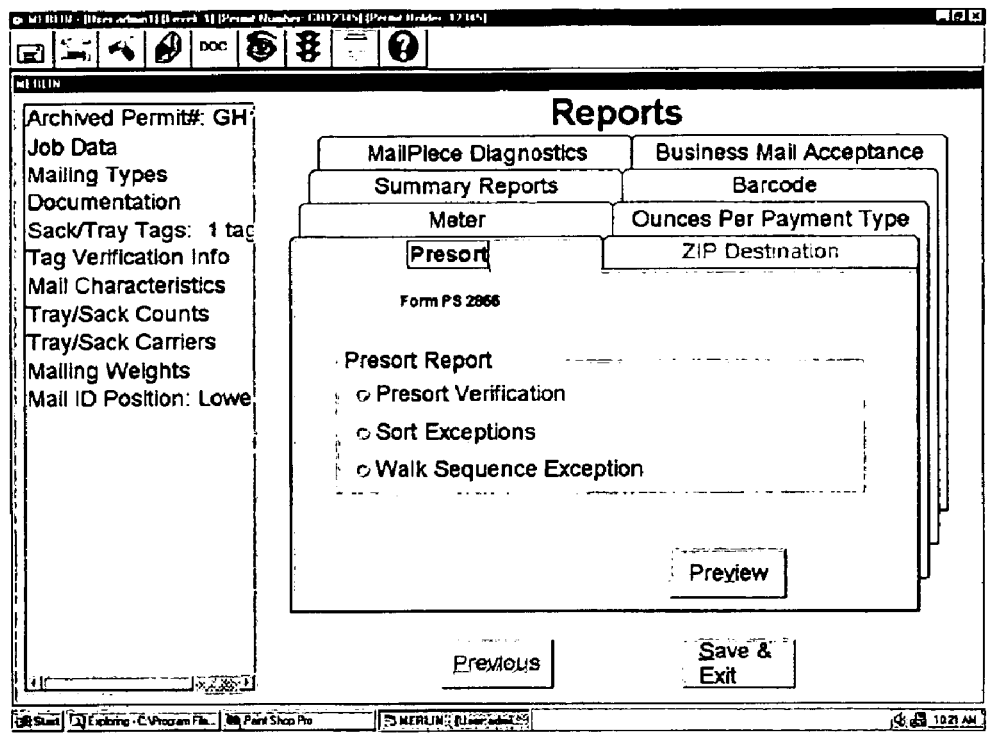
Figures 2, 5:
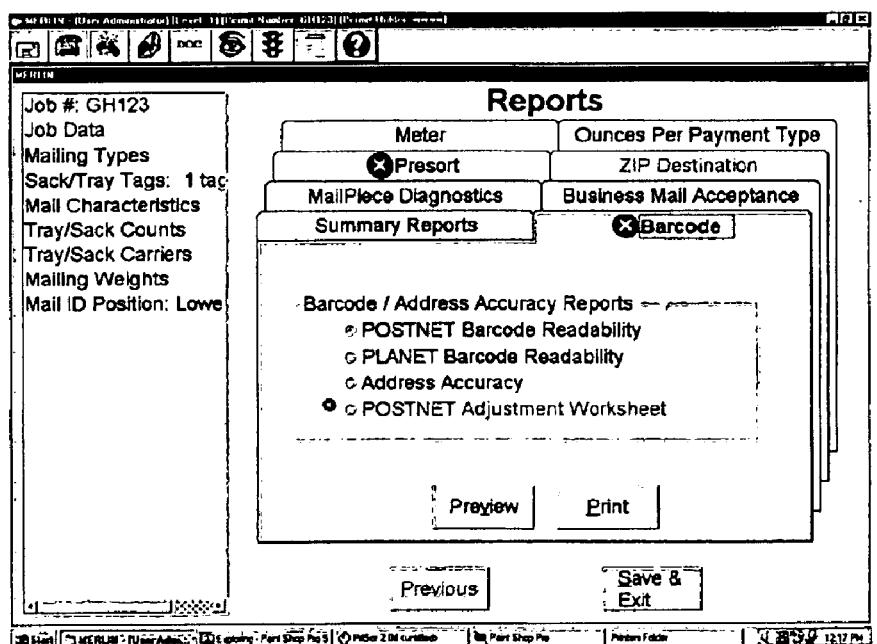

The block diagram of FIG. 2 depicts a control processor 201 that provides a user interface prompting the operator to perform specific actions, such as inputting data, loading the magazine, starting the transport mechanism, etc. After the operator enters all parameters, the required information is automatically measured. Measurement results are used to calculate and display bulk postage rate, total weight of mailing, number of sample units, error factor, percent error, additional postage due, and other relevant metrics.

With a throughput of 6,000 pieces per hour, the automatic verification system feeder unit 101 offers a reliable and powerful transport system. Mail pieces are directed from the feeder into the scale unit 102 that weighs individual mail pieces in line at a full 6,000 pieces per hour rate. After the weighing operation, the mail pieces are scanned by the camera unit 105.

The camera unit 105 is a premier ultra-high density line scan array CCD (charge coupled device) camera. The camera 105 will scan at a rate of at least 200 scan lines per inch. This high resolution enables the automatic inspection system 100 to accurately determine Postnet and Planet barcode quality and to read address information from each mailpiece, including optional endorsement line, numeric zip code, postnet barcode recognition and quality measurement, and street-line and city/state line, to verify barcode and postage data and to add other relevant information to the associated mailpiece data base. The system includes the capability to update and modify the databases as required Additionally, the height and length of each mailpiece is measured from either the image capture process, or from appropriately located sensors, or both. After the scanning operation, an ink jet printer 104 prints identification information on each mail piece. The print head of the ink jet printer unit 104 is preferably positioned in proximity to the camera unit 105 for ease of mounting. Further, a thickness detector 110 takes a thickness measurement as each mailpiece goes by.

The system may further include a report printer 202 that presents the results of the verification process to an operator in hard-copy format. A plurality of reports may be made available, as discussed in more detail below, and the reports may be structured to match existing customer report formats or may be custom designed for particular applications. The system may also incorporate a video display terminal 203 for use in job set-up, input of parameters, and display of results.

The video display terminal 203 may also be used for the display of images acquired by the system during verification operation. At the operator's option, the video display terminal may display the image acquired by scanning a particular mailpiece, and may indicate, via colored rectangles, shadings, etc., selected words, individual characters, address block location, stamp, or other indicia that has been determined by the image processing recognition software.

The camera scan field is illuminated by a high-intensity light system 106 in which optical fibers arrayed in associated lighting towers 107 direct light from a centrally located high-intensity lamp sub-system. A dense, random array of optical fibers within each tower 107 allows for bright, even illumination within the scan area.

The system assigns each mailpiece to a data file that individually registers each mailpiece. As the mailpiece is processed, the weight and thickness of each piece and the associated numeric identification number that is applied to the mailpiece by the ink jet printer are also recorded in the file. The image that is scanned by the camera unit is also processed and filed.

The scanned image is processed by identifying the address block on the mail piece, reading the address, and verifying the address information. The system registers the corresponding barcode value to the file, reads the stamp value and stores its marking, and scans the barcode in detail to ensure that the print quality meets USPS specifications. The system identifies the existence, if any, of a postage meter imprint and the value of postage it represents, and the existence and identification of a permit imprint. The printed bar code value and quality assessment are also stored in the file for the associated mailpiece. At this point, the individual mailpiece file includes the ID number that has been printed on the mailpiece by the ink jet printer, the weight, thickness, stamp value, any existing endorsement, the address barcode value, the printed barcode value, and the quality of the barcode/ZIP code. The system identifies and verifies the accuracy of the printed barcode against the results of an address search within its address database, and verifies that such aspects of the mail as postage paid, weight, etc., are consistent with the information provided by the mailer.

To aid in the acquisition of tray tag information, the verification system may incorporate a bar-code scanner 205 that reads the tray tag information. The tray tag information is generally expressed as a printed bar code on a tray or container of mail or other flat articles awaiting processing by the system. The tray tag generally includes information related to the contents of the tray, and thus defines a set of pre-established rules to which the articles must conform.

The verification process includes comparing information input to the system via keyboard 204, tray tag bar code scanner 205, scale 102, thickness detector 110, image acquisition and processing 105, and internal data bases to determine whether the pre-established rules have been followed.

The automatic verification system operates under the control of a Control Personal Computer (CPC) in communication with an Imaging Personal Computer (CPC). Communication between the CPC and IPC takes place over a bi-directional serial link that provides transfer of commands, status, and data packets in both directions.

The hardware interface between the CPC and IPC is an RS-232 serial link that is well known in the applicable art. The hardware protocol calls for full duplex asynchronous transmissions at 19,200 baud with 1 start bit, 8 data bits, 1 stop bit, and no parity.

Figures 3, 5:
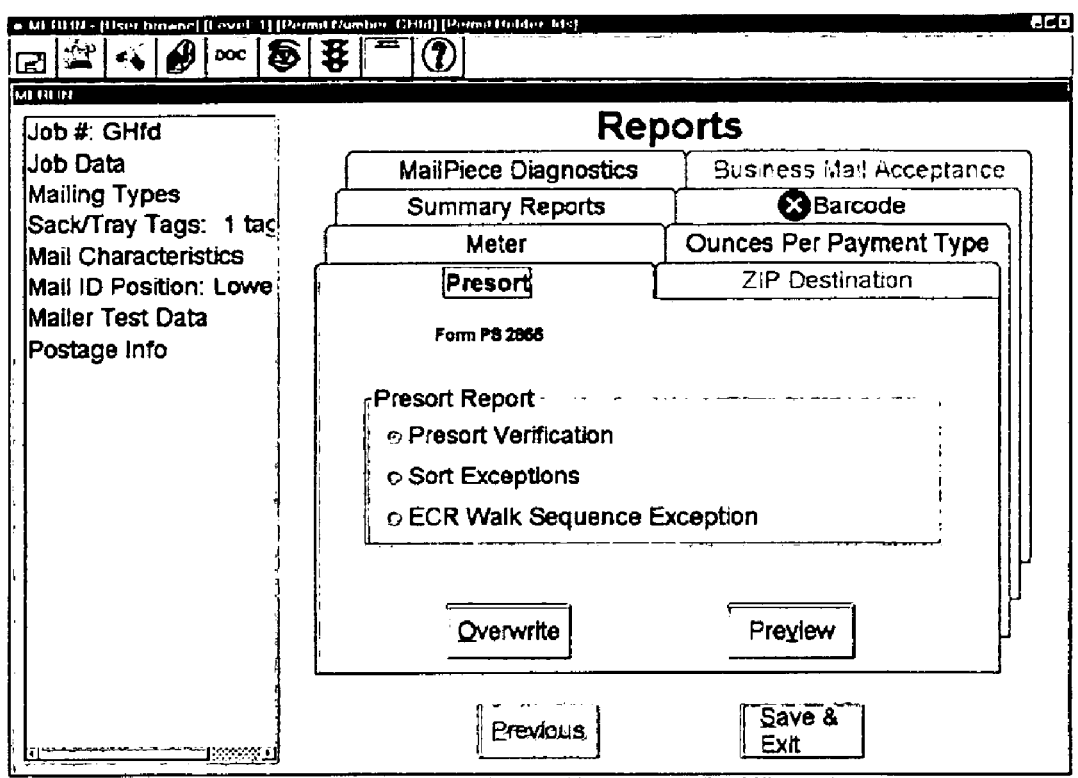

All serial messages between the IPC and CPC follow a predetermined format that is illustrated in FIG. 3. All messages begin with the START_CHAR and end with the STOP$_{13}$ CHAR. Each digit or character is sent using 8-bit ASCII (American Standard Code for Information Interchange). This is to ensure the ability to regain message synchronization if any characters are lost. The least significant bit of each byte is transferred first, in accordance with the ASCII standard. The CRC is a cyclic redundancy check computed by the sender and the recipient to make sure that no errors have occurred during transmission. It is formed using a selected CCITT polynomial, as is well known, and is computed over the range of characters from SEQUENCE_NO through DATA. The 16-bit CRC is converted to ASCII using hexadecimal notation and stored in the 4 bytes at CRC. All message types are composed of ASCII characters (alphabetic characters are preferred). This facilitates debugging with a serial line analyzer. BCD (binary coded decimal) data are transferred most-significant byte first. A message may have no data bytes. This minimum size of a message is nine (9) bytes. The various permissible message types are illustrated in FIG. 4.

Each message is acknowledged by the recipient with an ACK (acknowledgment message). An ACK informs the sender that the message has been received successfully, is understood, and is being acted upon. The sender of the original request knows to expect an ACK in response to its request. It is up to the sender to wait for this response.

A NACK (negative acknowledgment message) tells the sender that the message is either not understood or not supported by the receiver. A NACK never happens if the serial interface has performed successfully and the message sent was properly formatted.

The sender does not send another request message until the previous request has been ACKed or has timed out. The sender generally retries sending a message up to two (2) times if it has not been ACKed within a predetermined time period. The sender stamps each message with a unique sequence number. This number is generated from an internal 8-bit counter that is incremented after each message transaction, and is allowed to roll over from 0xFF to 0000. The receiver echoes this sequence number back in the ACK/NACK response to this message. The sender uses the same sequence number on retries.

In general, the CPC updates the IPC with the Mail Piece Identification Number (MPED), the Mail Piece Weight Data (MPWD), and its time stamp. In response, the IPC replies with information that was received by the scanned mail piece. The messages that are normally sent from the CPC to the IPC are summarized below:

1. Synchronization Message—This message is sent when a sensor mounted near the camera array detects a mailpiece within the camera zone.

2. Postage Message—This message is sent when the scale sub-system has completed weighing a piece of mail. This message conveys to the IPC the amount of postage this mailpiece is expected to contain. It is derived from the weight of the mailpiece and knowledge of the characteristics of the type of mailing being verified. In most cases, a postage rate derived from standard (or bulk rate) USPS postage rate schedules will be used. The only exception occurs when the image processing indicates that the mail piece is non-profit in nature. In that event, a special non-profit postage field included with the Postage Message is used to determine the expected postage for the mailpiece.

3. Begin Run Message—This message is sent at the start of a run to direct the IPC to clear its buffers and prepare for the start of an inspection run. Additional information is also passed to the IPC regarding the statistics for the mailing, such as time of mailing, payment method to be used, the mailer's permit or meter number, and the weight of a single piece of mail (in the event that the mailing is being made at an Identical Weight Rate).

4. Tray Label Message—This message is sent by the CPC to pass information taken from the tray label on the mailing tray that contains the mailpieces that are being examined. This information includes the tray label bar code, the tray ZIP code, destination city and state, and class and sub-class of mail in the tray.

5. Wedge Data Message—This message conveys the relevant information from a sample wedge (a predetermined quantity of mail concerning which characteristics are known).

The IPC also transmits messages to the CPC. Among the IPC-transmitted messages are the following:

1. Address Scan Result Message—This message sends a formatted set of parameters back to the CPC. The referenced mail piece ID is transmitted along with the mailpiece ZIP code appearing on the mail piece and the ZIP code derived from the address information on the mailpiece.

2. Postage Scan Result Message—This message sends a formatted set of parameters from the IPC back to the CPC. The referenced mailpiece ID is transmitted along with the mailpiece postage meter date, the mailpiece payment method, and the mailpiece amount paid.

3. Barcode Scan Result Message—In this message, the IPC transmits the reference mailpiece ID, the mailpiece barcode, and a measure of barcode readability.

Both the CPC and the IPC are capable of transmitting ACK and NACK messages, both initiating and responding to diagnostic messages, and transmitting error indication messages.

Referring now to FIGS. 5-1 to 5-46, and Tables 5-1 to 5-33, the various reports which are generated by the present invention are illustrated. As previously mentioned, after the mailpieces are processed as described above, a number of reports can be generated and viewed or printed. When all mail has been processed, a Reports Screen shown in FIG. 5-1 is displayed on the video display terminal 203. The Reports screen displays report options in a file folder format. Each folder contains options for selecting one or more reports. Selecting the desired folder tab, moves that folder to the front and a menu of reports that are available becomes visible on the front of the folder. Selecting one of these menu options causes the selected report to be generated. Selecting the Preview button allows the report to be displayed on the screen. Selecting the Save & Exit button saves the mailing run data and exits the user from the Reports screen. The Previous button is inactive on this screen. Three report folder tabs have an overwrite option. These folders include Presort, Business Mail Acceptance and Meter.

Not all folder tabs will be active for every mailing run and not all options within each category will be available. The type of analyses that was performed for the run determines the type of reports that can be generated.

When the Reports screen is displayed after a mailing run, any reports that have errors or discrepancies to report will be displayed with a red circle having a X or the like on the respective report folder tab. FIG. 5-2 shows an example of the reports screen with this symbol. As can be seen in this example, the Barcode and Presort reports tabs have the error symbol, indicating that at least one of the reports available in that folder have errors to report. The actual report that has the errors is shown in red, with the error symbol. These reports can be generated and viewed by the operator to determine which mailpiece or mailpieces failed a particular analysis.

The present invention has at least eighteen operational reports that can be generated after performing a mailing run. For example, the present invention produces the following operational reports:

Presort Reports Tab
   US Postal Service Presort Verification Record (PS 2866X)
   Sortation Exceptions Report
   ECR Sequence Exceptions Report Meter Reports Tab
   First-Class Metered Mail-Short Paid Mail Sampling Worksheet (PS 6116X)
   Short Paid Exceptions Report
   Meter Date Exceptions Report Ounces Per Payment Type Report Tab
   Payment Method by Ounce category Summary Report Summary Reports Tab
   Summary Verification Report
   End of Job Report
   Overwrite Summary Report Barcode Reports Tab
   POSTNET Barcode Readability Report
   PLANET Barcode Readability Report
   Address Accuracy Report
   POSTNET Barcode Readability Report Mailpiece Diagnostics Report Tab
   Mailpiece Diagnostics Report Mailpiece Characteristics Report
   Business Mail Acceptance Reports Tab
   Business Mail Acceptance Worksheet (PS 8040X)
     Business Mail Exceptions When pulled to the front, the Presort reports tab shows the reports that can be generated from this folder. The US Postal Service Verification Record (Presort Verification in the menu), the Sortation Exceptions Report (Sort Exceptions on the menu) and the Walk Sequence Exceptions Report are generated from here. FIG. 5-3 shows the Presort Reports Tab on the reports screen.

The overwrite option is available for the Presort Verification Record (PS 2866X) and allows the operator to eliminate system identified errors from the report. FIG. 5-4 shows the Overwrite screen.

Figures 5, 6, 7, 8, 9, 10, 11, 12, 13, 14, 15, 16, 17, 18, 19, 20:
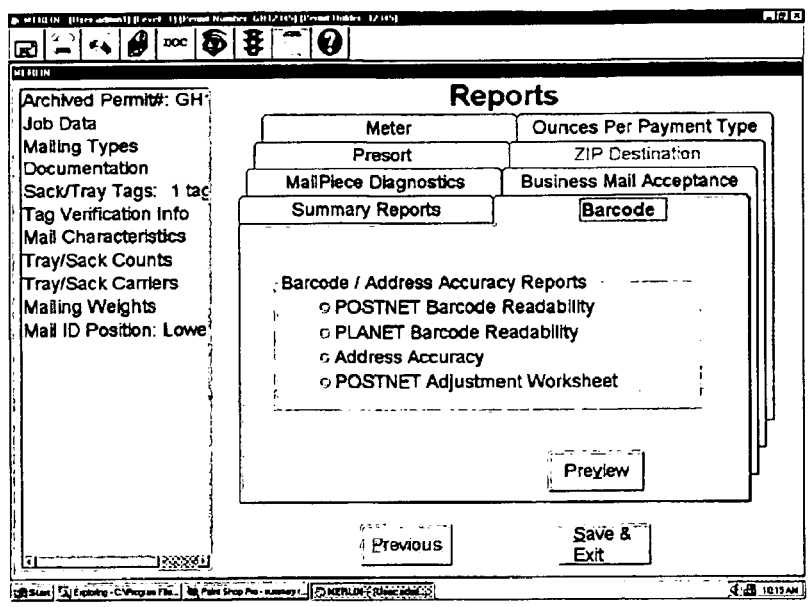
Figures 5, 6, 7, 8, 9, 10, 11, 12, 13, 14, 15, 16, 17, 18, 19, 20, 21:
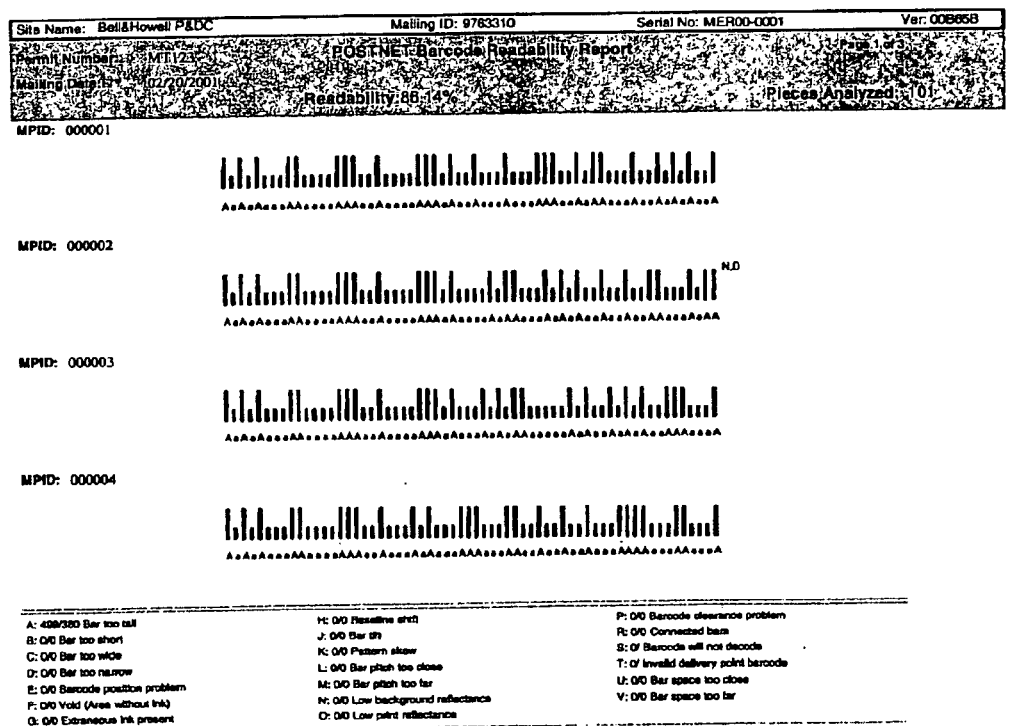
Figures 5, 6, 7, 8, 9, 10, 11, 12, 13, 14, 15, 16, 17, 18, 19, 20, 21, 22, 23, 24, 25, 26:
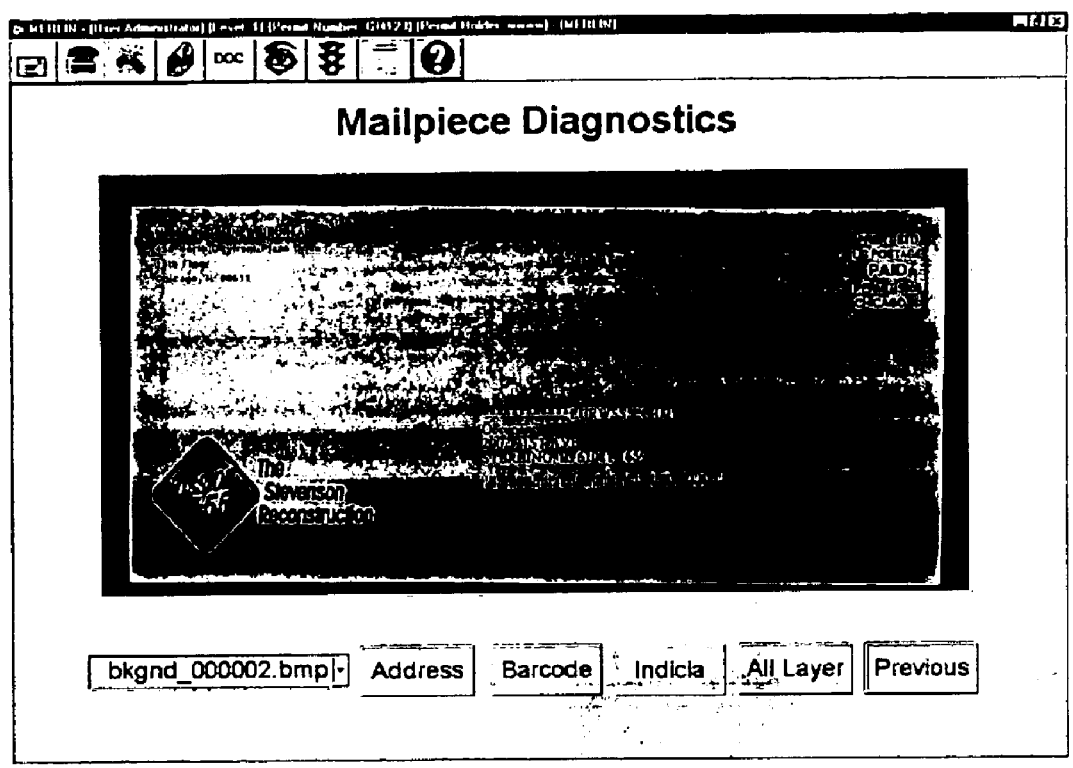
Figures 5, 6, 7, 8, 9, 10, 11, 12, 13, 14, 15, 16, 17, 18, 19, 20, 21, 22, 23, 24, 25, 26, 27:
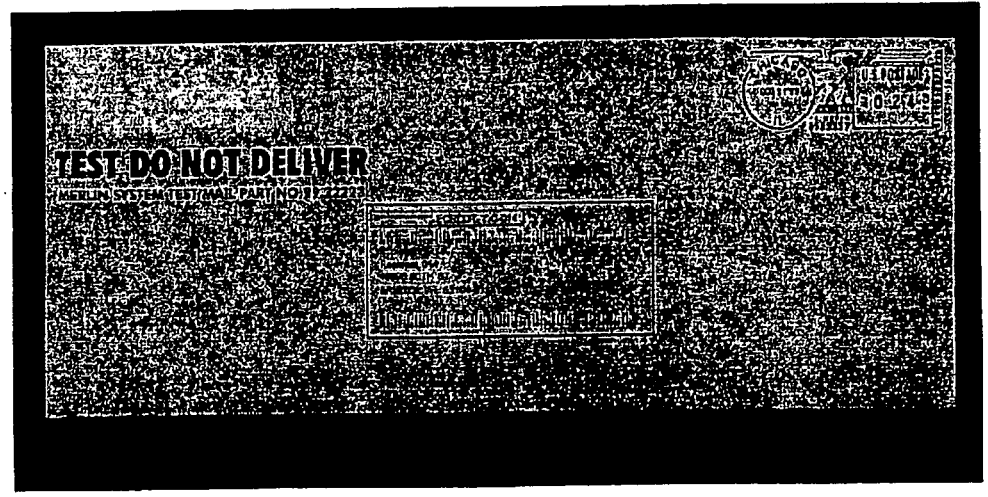
Figures 5, 6, 7, 8, 9, 10, 11, 12, 13, 14, 15, 16, 17, 18, 19, 20, 21, 22, 23, 24, 25, 26, 27, 28, 29, 30:
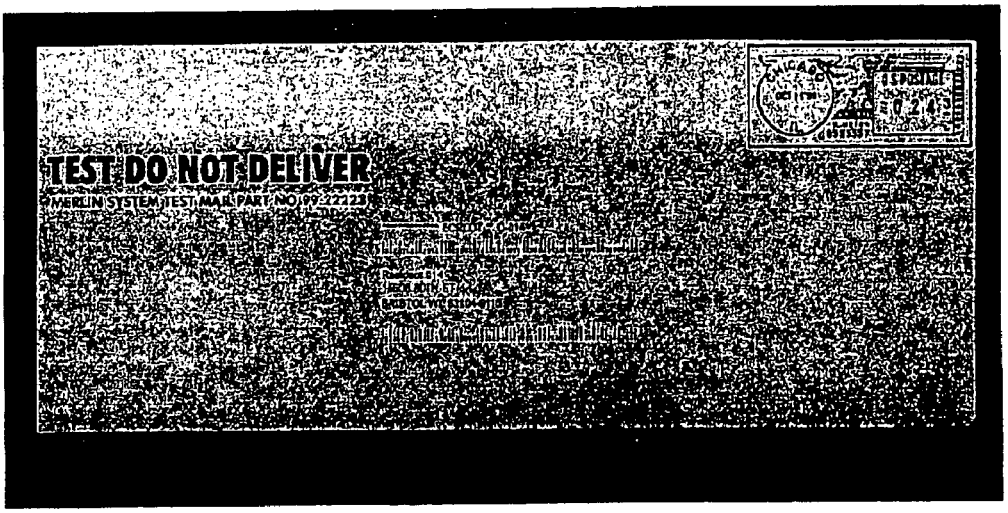

The US Postal Service Presort Verification Record is a report about the errors contained in a presorted mail delivery, a calculation of the costs, and a record of the disposition. FIGS. 5-5 and 5-6 show the report and Table 5-2 explains the fields on the report. Table 5-2 describes the information contained in the US Postal Service Presort Verification Record.

The Sortation Exception Report describes sortation error information about a mail run according to ZIP Destination or tray piece count, as well as the individual mailpiece errors identified by the present invention. FIG. 5-7 shows the report and Tables 5-3 and 5-4 describes the fields on the report. Table 5-3 describes the information contained in the summary section of the Sortation Exception Report When the Meter folder is placed at the front of the Reports Screen, three report options are displayed. Two are Short Paid Reports and the other is the Meter Date Report (shown on the menu as Meter Date Exceptions). The two Short Paid Reports are the FirstClass Metered Mail—Short Paid Mail Sampling Worksheet (PS 6116X—First Class Mail-Metered on the menu) and the Short Paid Exceptions Report, which is only available if there were exceptions to the PS 6116X report. The overwrite option is available for the First-Class Metered Mail—Short Paid Mail Sampling Worksheet (PS 6116X) and allows the operator to eliminate system identified errors from the report. FIG. 5-10 shows the Overwrite screen.

The First-Class Metered Mail—Short Paid Mail Sampling Worksheet lists the total number of shortpaid pieces in the mailing sample, as well as the postage due. It also provides the information in percentages of shortpaid pieces to total pieces sampled. That percentage is used to extrapolate the number of shortpaid pieces in the entire mailing and the resultant postage due for that mailing. FIG. 5-11 shows the worksheet. Table 5-7 describes the information contained in the First-Class Metered Mail—Short Paid Mail Sampling Worksheet.

Only mailpieces with exceptions to the PS 6116X—Short Paid Mail Sampling Worksheet are shown in the Short Paid Exceptions report. They are reported by individual mailpiece identification (MFID) number. FIG. 5-12 shows the Short Paid Exceptions Report.

The Meter Date Report contains information concerning the number of items in the sample with meters, the number with correct dates and the percentage of those with correct dates. It also lists the exceptions, by tray number and ID number, along with the meter date information that the present invention recognized. FIG. 5-13 shows the report. Table 5-9 describes the information contained in the Meter Date Report.

The Ounces Per Payment Type Report Tab does not have a menu of report options. When this tab is selected, the Payment Method by Ounce Category Summary Report is generated. FIG. 5-14 shows the Report screen with the Ounces Per Payment Type folder at the front. The Payment Method by Ounce Category Summary Report provides a count of how many mailpieces fall into each weight category, sorted by payment method and postage affixed amount. FIG. 5-15 shows the report and Table 5-10 describes the fields on the report and the information contained in the Payment Method by Ounce Category Summary Report.

The Summary Reports Tab has a menu with three report options. The Summary Verification Report, End of Job Report and Overwrite Summary Report are displayed in the menu. The reports screen with the Summary Reports folder displayed in front is shown in FIG. 5-16.

The Summary Verification Report describes summary information about a mail run. The types of analyses run on the sample are shown here as well as the USPS acceptance rate and the system's results for each analysis. If an analysis that affects postage rates failed, the postage due is also shown. FIG. 5-17 shows the report. Table 5-11 describes the information contained in the Summnary Verification Report.

The End of Job Report describes summary information about a mail run, including system performance, system utilization time and verification summary results. FIG. 5-18 shows the report. Table 5-12 describes the information contained in the End of Job Report.

The Overwrite Summary Report lists the manually overwritten data in a mailing from the Meter, Presort or Business Mail Acceptance report categories. The report is shown in FIG. 5-19. Table 5-13 describes the information contained in the Overwrite Summary Report.

The Barcode Reports tab displays a menu of 4 report options. These options are: Barcode Readability Report (POSTNET Barcode Readability on the menu), PLANET Barcode Readability Report, Address Accuracy Report and POSTNET Adjustment Worksheet. FIG. 5-20 shows the reports screen with the Barcode folder in front.

The POSTNET Barcode Readability Report describes summary information about the POSTNET barcodes in a mailing run, as well as specific mailpiece POSTNET barcode discrepancies. Overall readability for the mailing is shown in the top summary section of the report and specific problems are listed in the individual mailpiece section. Any codes that might be used to identify problems with the barcode are identified at the bottom of the report. FIG. 5-21 shows the report. Table 5-14 describes the information contained in the summary section of the POSTNET Barcode Readability Report. Only mailpieces with barcode readability errors are shown in the individual mailpiece section of the Barcode Readability Report. Table 5-15 describes the information contained in the individual mailpiece section of the report.

The PLANET Barcode Readability Report describes summary information about the PLANET barcodes in a mailing run, as well as specific mailpiece PLANET barcode discrepancies. Overall readability for the mailing is shown in the top summary section of the report and specific problems are listed in the individual mailpiece section. Any codes that might be used to identify problems with the barcode are identified at the bottom of the report FIG. 5-22 shows the report. Table 5-16 describes the information contained in the summary section of the PLANET Barcode Readability Report. Only mailpieces with barcode readability errors are shown in the individual mailpiece section of the PLANET Barcode Readability Report. Table 5-17 describes the information contained in the individual mailpiece section of the report.

The Address Accuracy Report describes summary information about addresses that matched the system's lookup information, as well as specific address mismatch information, sorted by Tray number and mailpiece ID number. FIG. 5-23 shows the report Table 5-18 describes the information contained in the summary section of the Address Accuracy Report. Only mailpieces with mismatched addresses are shown in the individual mailpiece section of the Address Accuracy Report. Table 5-19 describes the information contained in the individual mailpiece section of the report.

The POSTNET Barcode Readability Report Adjustment Worksheet provides information about the acceptability of barcode entries in a mailing. It also calculates the postage adjustment required based on problems with barcode readability. FIG. 5-24 shows the report. Table 5-20 describes the information contained in the Barcode Readability Report Adjustment Worksheet.

The Mailpiece Diagnostics Report Tab has a menu that lists 3 report options and a window that displays 5 saved mailpieces from the run, listed by mailpiece ID number. If selecting the Mailpiece Diagnostics Report, a mailpiece from this window must first be selected. The Piece Info Report and the Mailpiece Characteristics Report contain information about the entire mailing and do not use this window. FIG. 5-25 shows the reports screen with the Mailpiece Diagnostics folder in front.

When the Mailpiece Diagnostics Report is selected from the reports screen, the Mailpiece Diagnostics screen appears as shown in FIG. 5-26. Mailpiece Diagnostics is an analysis test that is run on selected mailpieces from a run. The window on the Mailpiece Diagnostics report folder (FIG. 5-25) lists the five mailpieces that can be used. These mailpieces are selected by the computer from the mailing run and saved for this test. The operator should select a mailpiece from this list before clicking on the Mailpiece Diagnostics Report button.

In the Mailpiece Diagnostics screen, a visual image of the selected mailpiece is displayed in the center of the screen. The selected mailpiece file name appears in the window at the bottom left corner of the screen. To analyze specific characteristics of the mailpiece, the user would click the Address, Barcode, or Indicia buttons, as desired. If the user selects the All Layer button, all three analyses will be performed. Selecting the Previous button will return you to the Reports screen shown in FIG. 5-25.

The Mailpiece Diagnostics Report has a section for each analysis that was run on the selected mailpiece. If all three analyses are run, then the three sections of the report will be Address Components, Barcode Components and Physical/Postage Components. FIG. 5-27 shows the Address components section of the report. The top portion of this section contains information about the address block, as interpreted by the system. The bottom portion shows an image of the mailpiece itself with a box around the address block. Table 5-21 describes the fields on the top portion of the report.

The next section of the Mailpiece Diagnostics Report, (if all three analyses were run), is the Barcode Components section. FIGS. 5-28 and 5-29 show both pages of the Barcode Components section. The top portion of this section of FIG. 5-28 shows the decoded result of the POSTNET barcode lookup and the decoded PLANET barcode. The bottom portion shows an image of the mailpiece with boxes around the barcodes.

FIG. 5-29 shows the second page of the Barcode Components section. The top portion of this page lists all the codes for barcode quality errors. The next area (POSTNET Barcode) lists all the minimum and maximum criteria for the barcode as well as reflectance percentages for the barcode and the background. The POSTNET barcode is printed underneath the shaded area. The bottom portion of this page (PLANET Code) shows the same type of information as for the POSTNET Barcode area, except for reflectance information. The PLANET barcode is also printed underneath this shaded area. In the example shown in FIG. 5-29, error codes are shown underneath the barcode. These error codes can be deciphered from the list at the top of the page.

FIG. 5-30 shows the Physical/Postage Components section of the report The top portion of this section lists information about the payment indicia as well as physical information about the mailpiece as determined by the system of the present invention. The bottom portion shows an image of the mailpiece with boxes around the payment indicia and the separator label.

The Mailpiece Characteristics Report describes summary information about a mail run, as well as specific mailpiece characteristics that are not within specification. FIG. 5-31 is an example of a Mailpiece Characteristics Report. Table 5-22 describes the information contained in the summary section of the Mailpiece Characteristics Report. Only mailpieces with height, length, thickness or weight errors are shown in the individual mailpiece section of the Mailpiece Characteristics Report Table 5-23 describes the information contained in the individual mailpiece section.

When the Business Mail Acceptance Report Tab is selected and the folder is brought to the front, the reports that are available are the PS 8040X—Business Mail Acceptance Worksheet and the Mailpiece Doubles Exceptions Report (displayed on the menu as Business Mail Exceptions Report). FIG. 5-32 shows this menu. The overwrite option is available for the Business Mail Acceptance Worksheet (PS 8040X) and allows the operator to eliminate system identified errors from the report. FIG. 5-33 shows the Overwrite screen.

The Business Mail Acceptance Worksheet is a summary sheet with information required to determine if business mailing meets acceptance criteria. Table 5-25 describes the information contained in the Business Mail Acceptance Worksheet.

The Business Mail Exceptions Report provides detailed information about a mail run, as well as the individual information about mailpieces whose measured weight was excluded from the samples average weight. Table 5-26 describes the information contained in the summary section of the Business Mail Exceptions Report. Table 5-27 describes the information contained in the sorted information section of the report.

There are two reports that may be generated at the end of each day and can be accessed from the system's toolbar, which is present at the top of most of the system's screens. The toolbar is shown in FIG. 5-41. Most of the icons in the toolbar are used by maintenance technicians for remote diagnostics or to access maintenance reports. The Statistics Reports icon (second from the right) is the icon used to access the end of day reports.

When the Statistic Reports icon on the toolbar is selected a popup window appears. The popup window (shown in FIG. 5-42) gives the user the option of selecting either the End of Day Report or the Daily Statistics Report.

When the End of Day button is selected from the pop up window (FIG. 5-42), the End of Day screen appears as shown in FIG. 5-43. Table 5-31 describes the options available from this screen. The End of Day Report covers the previous 24-hour period, from midnight to midnight. The report is divided into 5 sections that summarize number of jobs, time the system was in use, amount of time the system had a fault condition, the number of faults for each section of the machine and the throughput for each category of mail. The End of Day Report is shown in FIG. 5-44.

When the Daily Statistics button is selected from the pop up window (FIG. 5-42), the Daily Statistics Report screen appears as shown in FIG. 5-45. Table 5-33 describes the options available from this screen. The Daily Statistics Report has the same information as the End of Day report. The difference between the two is the period of time that is covered. The Daily Statistics report includes information from midnight up until the time that the report is generated. FIG. 5-46 shows the Daily Statistics Report. For a description of each of the fields of the report, refer to Table 5-33, the table for the End of Day report.

Accordingly, it should readily be understood that the present invention can function to perform at least the following analyses: Address accuracy, namely, comparison of Postnet barcode to the system's street-line and city/state line lookup to verify the mailer is using valid directory and/or directory rules; Walk sequence and Line of Travel accuracy (ECR Sequence); Comparing physical characteristics to mail processing category, i.e., letter, flat, parcel (Mailpiece Characteristics); Estimated piece count—for identical weight mail—estimate number of pieces by dividing net weight (gross-tare_by average weight, and compare to number declared by mailer (Business Mail Acceptance); Package sortation verification, namely, checking presort subsets within a container, first piece to remaining package pieces; Identify multi-ounce piece using scale and determine if additional ounce postage is affixed (visible) on mailpiece (Short Paid); Reporting sample processed by postage and weight information and compare to mailer declared quantity and type; Apply USPS cost avoidance factor on applicable verifications (e.g., Presort, Short Paid, Barcode quality); Produce summary with overall verification results; Produce detailed exception reports identifying each piece in any verification found in error; Produce Diagnostic Report that can communicate a sample piece's results (Mailpiece Diagnostic); and Transmit summary information to a national results database via any suitable communications link.

There has been described herein an automatic verification method and system that is relatively free from the shortcomings of verification processes of the prior art. It will be apparent to those skilled in the art that modifications may be made without departing from the spirit and scope of the invention. Accordingly, it is not intended that the invention be limited except as may be necessary in view of the appended claims.

What is claimed is:

1. An apparatus for verifying a batch of mailpieces relative to at least one presort parameter, apparatus comprising:

an image acquisition device for capturing information affixed to the mailpieces; and a processor for analyzing the information with respect to the at least one presort parameter to determine whether the information corresponds to the at least one presort parameter;

wherein the processor determines an error factor based upon a number of conforming and non-confirming mailpieces, and determines an additional postage due amount based upon the error factor.

2. The apparatus of claim 1, wherein the at least one presort parameter includes a barcode print quality restriction, and wherein the information includes a barcode, such that the processor determines whether the barcode on each of the mailpieces conforms to the barcode print quality restriction.

3. The apparatus of claim 1, wherein the at least one presort parameter includes a barcode decode value compatibility restriction, and wherein the information includes an address and a barcode having a barcode decode value, such that the processor determines whether the barcode decode value is compatible with the address, to determine whether the mailpieces conform to the barcode value compatibility restriction.

4. The apparatus of claim 1, further comprising a scale for weighing the mailpieces, and wherein the at least one presort parameter includes a weight restriction, and wherein each of the mailpieces has a weight, such that the processor determines whether the weight of each of the mailpieces conforms to the weight restriction.

5. The apparatus of claim 1, wherein the at least one presort parameter includes a postage type restriction, and wherein the information includes a postage type, such that the processor determines whether the postage type on each of the mailpieces conforms to the postage type restriction.

6. The apparatus of claim 5, wherein the postage type is meter, permit of stamp.

7. The apparatus of claim 1, wherein the at least one presort parameter includes a postage type restriction, and wherein the information includes a postage value, such that the processor determines whether the postage value on each of the mailpieces conforms to the postage value restriction.

8. The apparatus of claim 1, wherein the at least one presort parameter includes a postage class restriction, and wherein the information includes a postage class, such that the processor determines whether the postage class on each of the mailpieces conforms to the postage class restriction.

9. The apparatus of claim 1, wherein the at least one presort parameter includes a zip code presort restriction, and wherein the information includes a zip code, such that the processor determines whether the zip code on each of the mailpieces conforms to the zip code presort restriction.

10. The apparatus of claim 1, wherein the processor generates a report corresponding to the analyzed information.

11. A method for verifying a batch of mailpieces relative to at least one presort parameter, the method comprising the steps of:

capturing information affixed to the mailpieces;

analyzing the information with respect to the at least one presort parameter to determine whether the information corresponds to the at least one presort parameter;

determining an error factor based upon a number of conforming and non-conforming mailpieces; and determining an additional postage due amount based upon the error factor.

12. The method of claim 11, wherein the at least one presort parameter includes a barcode print quality restriction, and wherein the information includes a barcode, the method further comprising the step of determining whether the barcode on each of the mailpieces conforms to the barcode print quality restriction.

13. The method of claim 11, wherein the at least one presort parameter includes a barcode decode value compatibility restriction, and wherein the information includes an address and a barcode having a barcode decode value, the method further comprising the step of determining whether the barcode decode value is compatible with the address, to determine whether the mailpieces conform to the barcode decode value compatibility restriction.

14. The method of claim 11, wherein the at least one presort parameter includes a weight restriction, and wherein each of the mailpieces has a weight, the method further comprising the step of weighing the mailpieces and determining whether the weight of each of the mailpieces conforms to the weight restriction.

15. The method of claim 11, wherein the at least one presort parameter includes a postage type restriction, and wherein the information includes a postage type, the method further comprising the step of determining whether the postage type on each of the mailpieces conforms to the postage type restriction.

16. The method of claim 15, wherein the postage type is meter, permit or stamp.

17. The method of claim 11, wherein the at least one presort parameter includes a postage value restriction, and wherein the information includes a postage value, the method further comprising the step of determining whether the postage value on each of the mailpieces conforms to the postage value restriction.

18. The method of claim 11, wherein the at least one presort parameter includes a postage class restriction, and wherein the information includes a postage class, the method further comprising the step of determining whether the postage class on each of the mailpieces conforms to the postage class restriction.

19. The method of claim 11, wherein the at least one presort parameter includes a zip code presort restriction, and wherein the information includes a zip code, the method further comprising the step of determining whether the zip code on each of the mailpieces conforms to the zip code presort restriction.

20. The method of claim 11, further comprising the step of generating a report corresponding to the analyzed information.

* * * * *